United States Patent
Holmberg et al.

(10) Patent No.: US 11,310,538 B2
(45) Date of Patent: Apr. 19, 2022

(54) AUDIOVISUAL COLLABORATION SYSTEM AND METHOD WITH LATENCY MANAGEMENT FOR WIDE-AREA BROADCAST AND SOCIAL MEDIA-TYPE USER INTERFACE MECHANICS

(71) Applicant: SMULE, INC., San Francisco, CA (US)

(72) Inventors: Anton Holmberg, Berkeley, CA (US); Benjamin Hersh, San Francisco, CA (US); Jeannie Yang, San Francisco, CA (US); Yuning Woo, San Francisco, CA (US); Wang Liang, San Francisco, CA (US); Perry R. Cook, Jacksonville, OR (US); Jeffrey C. Smith, San Francisco, CA (US)

(73) Assignee: Smule, Inc., San Francisco, CA (US)

( * ) Notice: Subject to any disclaimer, the term of this patent is extended or adjusted under 35 U.S.C. 154(b) by 0 days.

(21) Appl. No.: 16/443,022

(22) Filed: Jun. 17, 2019

(65) Prior Publication Data

US 2019/0306540 A1 Oct. 3, 2019

Related U.S. Application Data

(63) Continuation-in-part of application No. 15/944,537, filed on Apr. 3, 2018, now Pat. No. 11,032,602.
(Continued)

(51) Int. Cl.
*H04N 21/2187* (2011.01)
*H04L 29/06* (2006.01)
(Continued)

(52) U.S. Cl.
CPC ....... *H04N 21/2187* (2013.01); *H04L 65/602* (2013.01); *H04N 21/233* (2013.01)

(58) Field of Classification Search
CPC . H04N 21/2187; H04N 21/233; H04L 65/602
See application file for complete search history.

(56) References Cited

U.S. PATENT DOCUMENTS

| 4,688,464 A | 8/1987 | Gibson et al. |
| 5,231,671 A | 7/1993 | Gibson et al. |
| (Continued) | | |

FOREIGN PATENT DOCUMENTS

| CN | 102456340 A | 5/2012 |
| CN | 102982832 A | 3/2013 |
| (Continued) | | |

OTHER PUBLICATIONS

PCT International Search Report of International Search Authority for counterpart application, dated Feb. 17, 2016, of PCT/US2015/058373 filed Oct. 30, 2015.
(Continued)

*Primary Examiner* — William G Trost, IV
*Assistant Examiner* — Monishwar Mohan
(74) *Attorney, Agent, or Firm* — Haynes and Boone, LLP

(57) ABSTRACT

Techniques have been developed to facilitate the livestreaming of group audiovisual performances. Audiovisual performances including vocal music are captured and coordinated with performances of other users in ways that can create compelling user and listener experiences. For example, in some cases or embodiments, duets with a host performer may be supported in a sing-with-the-artist style audiovisual livestream in which aspiring vocalists request or queue particular songs for a live radio show entertainment format. The developed techniques provide a communications latency-tolerant mechanism for synchronizing vocal performances captured at geographically-separated devices (e.g., at globally-distributed, but network-connected mobile
(Continued)

phones or tablets or at audiovisual capture devices geographically separated from a live studio).

28 Claims, 10 Drawing Sheets

Related U.S. Application Data

(60) Provisional application No. 62/685,727, filed on Jun. 15, 2018, provisional application No. 62/480,610, filed on Apr. 3, 2017.

(51) Int. Cl.
*H04N 21/233* (2011.01)
*H04L 65/60* (2022.01)

(56) References Cited

U.S. PATENT DOCUMENTS

| | | | |
|---|---|---|---|
| 5,301,259 A | 4/1994 | Gibson et al. | |
| 5,477,003 A | 12/1995 | Muraki et al. | |
| 5,719,346 A | 2/1998 | Yoshida et al. | |
| 5,811,708 A | 9/1998 | Matsumoto | |
| 5,889,223 A | 3/1999 | Matsumoto | |
| 5,902,950 A | 5/1999 | Kato et al. | |
| 5,939,654 A | 8/1999 | Anada | |
| 5,966,687 A | 10/1999 | Ojard | |
| 6,121,531 A | 9/2000 | Kato | |
| 6,307,140 B1 | 10/2001 | Iwamoto | |
| 6,336,092 B1 | 1/2002 | Gibson et al. | |
| 6,353,174 B1 | 3/2002 | Schmidt et al. | |
| 6,369,311 B1 | 4/2002 | Iwamoto | |
| 6,971,882 B1 | 12/2005 | Kumar et al. | |
| 7,003,496 B2 | 2/2006 | Ishil et al. | |
| 7,068,596 B1 | 6/2006 | Mou | |
| 7,096,080 B2 | 8/2006 | Asada et al. | |
| 7,297,858 B2 | 11/2007 | Paepcke | |
| 7,853,342 B2 | 12/2010 | Redmann | |
| 8,682,653 B2 | 3/2014 | Salazar et al. | |
| 8,868,411 B2 | 10/2014 | Cook et al. | |
| 8,983,829 B2 | 3/2015 | Cook et al. | |
| 8,996,364 B2 | 3/2015 | Cook et al. | |
| 9,058,797 B2 | 6/2015 | Salazar et al. | |
| 9,147,385 B2 | 9/2015 | Salazar et al. | |
| 9,305,601 B1 * | 4/2016 | Itelman | G11B 27/036 |
| 9,324,330 B2 | 4/2016 | Chordia et al. | |
| 9,601,127 B2 | 3/2017 | Yang et al. | |
| 9,866,731 B2 | 1/2018 | Godfrey et al. | |
| 9,911,403 B2 | 3/2018 | Sung et al. | |
| 2002/0004191 A1 | 1/2002 | Tice et al. | |
| 2002/0032728 A1 | 3/2002 | Sako et al. | |
| 2002/0051119 A1 | 5/2002 | Sherman et al. | |
| 2002/0056117 A1 | 5/2002 | Hasegawa et al. | |
| 2002/0082731 A1 | 6/2002 | Pitman et al. | |
| 2002/0091847 A1 | 7/2002 | Curtin | |
| 2002/0177994 A1 | 11/2002 | Chang et al. | |
| 2003/0014262 A1 | 1/2003 | Kim | |
| 2003/0099347 A1 | 5/2003 | Ford et al. | |
| 2003/0100965 A1 | 5/2003 | Sitrick et al. | |
| 2003/0117531 A1 | 6/2003 | Rovner et al. | |
| 2003/0164924 A1 | 9/2003 | Sherman et al. | |
| 2004/0159215 A1 | 8/2004 | Tohgi et al. | |
| 2004/0263664 A1 | 12/2004 | Aratani et al. | |
| 2005/0120865 A1 | 6/2005 | Tada | |
| 2005/0123887 A1 | 6/2005 | Joung et al. | |
| 2005/0252362 A1 | 11/2005 | McHale et al. | |
| 2006/0165240 A1 | 7/2006 | Bloom et al. | |
| 2006/0206582 A1 | 9/2006 | Finn | |
| 2007/0065794 A1 | 3/2007 | Mangum | |
| 2007/0140510 A1 | 6/2007 | Redmann | |
| 2007/0150082 A1 | 6/2007 | Yang et al. | |
| 2007/0245881 A1 | 10/2007 | Egozy et al. | |
| 2007/0245882 A1 | 10/2007 | Odenwalk | |
| 2007/0250323 A1 | 10/2007 | Dimkovic et al. | |
| 2007/0260690 A1 | 11/2007 | Coleman | |
| 2007/0287141 A1 | 12/2007 | Milner | |
| 2007/0294374 A1 | 12/2007 | Tamori | |
| 2008/0033585 A1 | 2/2008 | Zopf | |
| 2008/0105109 A1 | 5/2008 | Li et al. | |
| 2008/0156178 A1 | 7/2008 | Georges et al. | |
| 2008/0190271 A1 | 8/2008 | Taub et al. | |
| 2008/0270541 A1 * | 10/2008 | Keener | H04N 21/6125 709/206 |
| 2008/0312914 A1 | 12/2008 | Rajendran et al. | |
| 2009/0003659 A1 | 1/2009 | Forstall et al. | |
| 2009/0038467 A1 | 2/2009 | Brennan | |
| 2009/0063419 A1 * | 3/2009 | Nurminen | G06F 16/1834 |
| 2009/0106429 A1 | 4/2009 | Siegal et al. | |
| 2009/0107320 A1 | 4/2009 | Willacy et al. | |
| 2009/0165634 A1 | 7/2009 | Mahowald | |
| 2010/0005501 A1 * | 1/2010 | Stokking | H04N 21/4341 725/115 |
| 2010/0126331 A1 | 5/2010 | Golovkin et al. | |
| 2010/0142926 A1 | 6/2010 | Coleman | |
| 2010/0157016 A1 | 6/2010 | Sylvain | |
| 2010/0087240 A1 | 8/2010 | Egozy et al. | |
| 2010/0192753 A1 | 8/2010 | Gao et al. | |
| 2010/0203491 A1 | 8/2010 | Yoon | |
| 2010/0326256 A1 | 12/2010 | Emmerson | |
| 2011/0126103 A1 | 5/2011 | Cohen et al. | |
| 2011/0144981 A1 | 6/2011 | Salazar et al. | |
| 2011/0144982 A1 | 6/2011 | Salazar et al. | |
| 2011/0144983 A1 | 6/2011 | Salazar et al. | |
| 2011/0154197 A1 | 6/2011 | Hawthorne et al. | |
| 2011/0251841 A1 | 10/2011 | Cook et al. | |
| 2011/0251842 A1 * | 10/2011 | Cook | G10H 1/366 704/207 |
| 2013/0006625 A1 | 1/2013 | Gunatilake et al. | |
| 2013/0254231 A1 | 9/2013 | Decker et al. | |
| 2014/0007147 A1 | 1/2014 | Anderson | |
| 2014/0105411 A1 | 4/2014 | Santos et al. | |
| 2014/0181881 A1 * | 6/2014 | Haot | H04N 21/4788 725/110 |
| 2014/0229831 A1 | 8/2014 | Chordia et al. | |
| 2014/0282748 A1 | 9/2014 | McNamee et al. | |
| 2014/0290465 A1 | 10/2014 | Salazar et al. | |
| 2015/0201161 A1 | 7/2015 | Lachapelle | |
| 2015/0279427 A1 | 10/2015 | Godfrey et al. | |
| 2016/0057316 A1 * | 2/2016 | Godfrey | G10L 13/0335 348/515 |
| 2016/0358595 A1 * | 12/2016 | Sung | G11B 27/28 |
| 2018/0007098 A1 * | 1/2018 | Malatesha | H04L 65/4015 |
| 2018/0152736 A1 * | 5/2018 | Alexander | H04N 21/41407 |
| 2019/0182554 A1 * | 6/2019 | Schupak | H04N 21/2187 |

FOREIGN PATENT DOCUMENTS

| | | |
|---|---|---|
| CN | 108040497 A | 5/2018 |
| EP | 1065651 | 1/2001 |
| EP | 2018058 | 1/2009 |
| GB | 2554322 | 3/2018 |
| JP | 2006-311079 | 11/2006 |
| JP | 2016206575 | 12/2016 |
| KR | 10-2007-0016901 A | 2/2007 |
| KR | 10-1605497 B1 | 3/2016 |
| WO | WO2003030143 | 4/2003 |
| WO | WO2011075446 | 6/2011 |
| WO | WO2011130325 | 10/2011 |
| WO | 2015103415 A1 | 7/2015 |
| WO | WO2016070080 | 5/2016 |
| WO | WO2016196987 | 12/2016 |
| WO | WO2018187360 | 10/2018 |

OTHER PUBLICATIONS

PCT International Search Report/Written Opinion of International Search Authority for Counterpart application, dated Oct. 17, 2016 of PCT/US2016/035810.

Kuhn, William. "A Real-Time Pitch Recognition Algorithm for Music Applications." Computer Music Journal, vol. 14, No. 3, Fall 1990, Massachusetts Institute of Technology, Print pp. 60-71.

(56) References Cited

OTHER PUBLICATIONS

Johnson. Joel. "Glee on iPhone More than Good—It's Fabulous." Apr. 15, 2010. Web. http://gizmodo.com/5518067/glee-on-iphone-more-than-goodits-fabulous. Accessed Jun. 28, 2011. p. 1-3.

Wortham, Jenna. "Unleash Your Inner Gleek on the iPad." Bits, The New York Times. Apr. 15, 2010. Web. <http:.

Gerhard, David. "Pitch Extraction and Fundamental Frequency: History and Current Techniques." Department of Computer Science, University of Regina, Saskatchewan, Cananda. Nov. 2003 Print. p. 1-22.

"Auto-Tune: Intonation Correcting Plug-In." User's Manual. Antares Audio Technologies. 2000. Print. p. 1-52.

Trueman, Daniel. et al "PLOrk: the Princton Laptop Orchestra, Year 1. "Music Department, Princeton University. 2009 Print. 10 pages.

Conneally, Tim. "The Age of Egregious Auto-tuning: 1998-2009." Tech Gear News-Betanews. Jun. 15, 2009. Web. www.betanews.com/artical/the-age-of-egregious-autotuning-19982009/1245090927 Accessed Dec. 10, 2009.

Baran, Tom. "Autotalent v0.2: Pop Music in a Can!" Department of Electrical Engineering and Computer Science, Massachusetts Institute of Technology. May 22, 2011. Web. http//web.mit.edu/tbaran/www/autotalent.html> Accessed Jul. 5, 2011. p. 1-5.

Atal, Bishnu S. "The History of Linear Prediction." IEEE Signal Processing Magazine. vol. 154, Mar. 2006 Print. p. 154-161.

Shaffer, H. and Ross, M. and Cohen, A. "AMDF Pitch Extractor." 85th Meeting Acoustical Society of America. vol. 54:1, Apr. 13, 1973. Print. p. 340.

Kumparak , Greg. "Gleeks Rejoice! Smule Packs Fox's Glee Into A Fantastic IPhone Application" MobilCrunch. Apr. 15, 2010 Web. Accessed Jun. 28, 2011; <http://www.mobilecrunch.com/2010/04/15gleeks-rejoice-smule-packs-foxs-glee-into-a-fantastic-iphone-app/>.

Rabiner, Lawrence R. "On the Use of Autocorrelation Analysis for Pitch Detection." IEEE Transactions on Acoustics, Speech, and Signal Processing. vol. Assp. -25:Feb. 1, 1977. Print p. 24-33.

Wang, Ge. "Designing Smule's IPhone Ocarina." Center for Computer Research in Music and Acoustics, Standford University. Jun. 2009. Print 5 pages.

Clark, Don; "MuseAmi Hopes to Take Music Automation to New Level." The Wall Street Journal, Digits, Technology News and Insigts, Mar. 19, 2010 Web. Accessed Jul. 6, 2011 <http://blogs.wsj.com/digits/2010/19/museami-hopes-to-take-music-automation-to-new-level/>.

Ananthapadmanabha, Tirupattur V. et al. "Epoch Extraction from Linear Prediction Residual for Identification of Closed Glottis Interval." IEEE Transactions on Acoustics, Speech, and Signal Processing, vol. ASSP-27:4. Aug. 1979. Print, p. 309-319.

Cheng, M.J. "Some Comparisons Among Several Pitch Detection Algorithms." Bell Laboratories. Murray Hill, NJ. 1976. p. 332-335.

International Search Report and Written Opinion mailed in International Application No. PCT/US2010/60135 dated Feb. 8, 2011, 17 pages.

International Search Report mailed in International Application No. PCT/US2011/032185 dated Aug. 17, 2011, 6 pages.

Johnson-Bristow, Robert. "A Detailed Analysis of a Time-Domain Formant Corrected Pitch Shifting Alogorithm" AES: An Audio Engineering Society Preprint. Oct. 1993. Print. 24 pages.

Lent, Keith. "An Efficient Method for Pitch Shifting Digitally Sampled Sounds." Departments of Music and Electrical Engineering, University of Texas at Austin. Computer Music Journal, vol. 13:4, Winter 1989, Massachusetts Institute of Technology. Print. p. 65-71.

McGonegal, Carol A. et al. "A Semiautomatic Pitch Detector (SAPD)." Bell Laboratories. Murray Hill, NJ. May 19, 1975. Print. p. 570-574.

Ying, Goangshiuan S. et al. "A Probabilistic Approach to AMDF Pitch Detection." School of Electrical and Computer Engineering, Purdue University. 1996. Web. <http://purcell.ecn.purdue.edu/~speechg>. Accessed Jul. 5, 2011. 5 pages.

Movie Maker, "Windows Movie Maker: Transitions and Video Effects", [online], published Jan. 2007.

PCT International Search Report/Written Opinion of International Search Authority for Counterpart application, dated Sep. 28, 2018 of PCT/US2018/025937.

\* cited by examiner

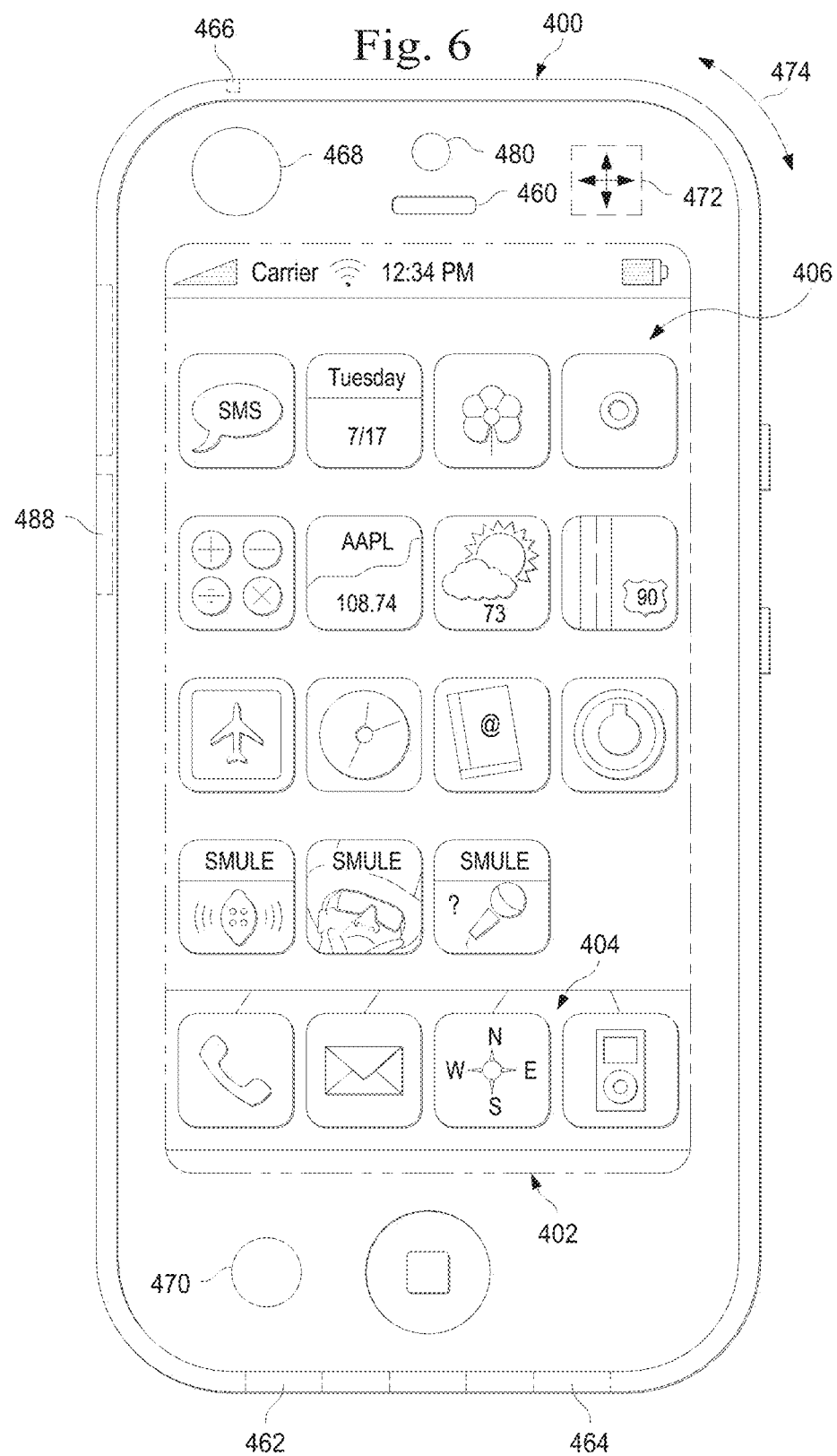

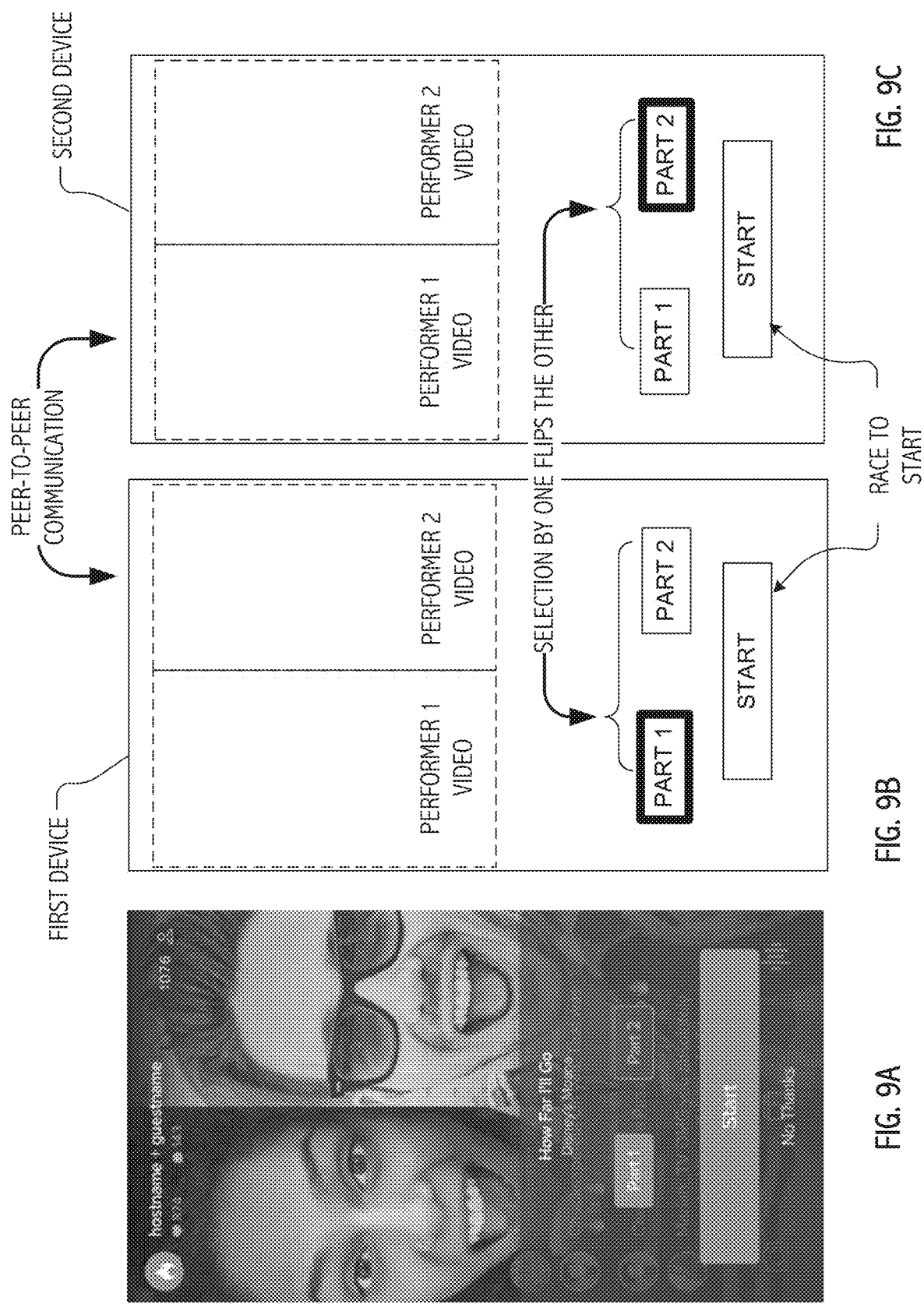

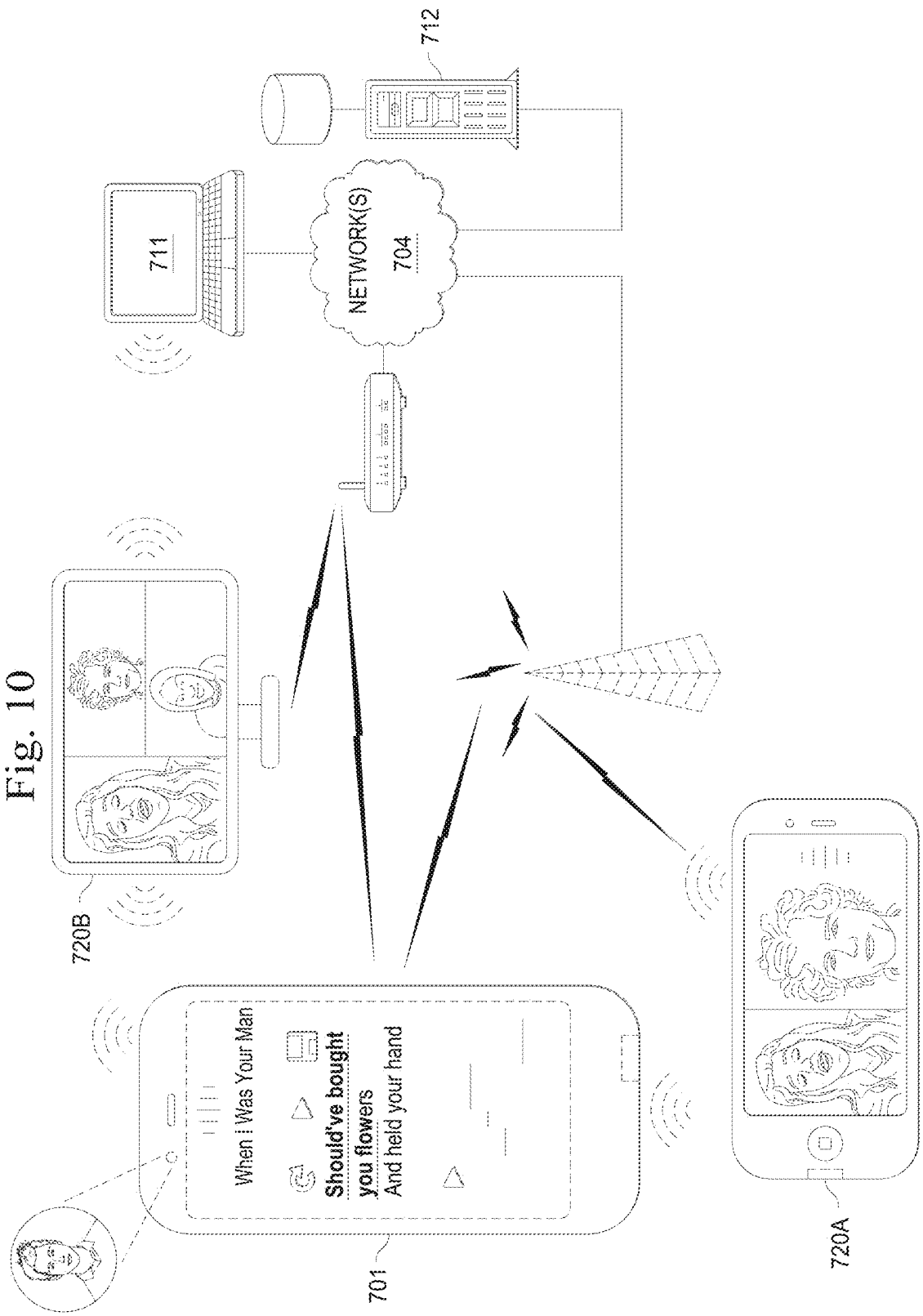

AUDIOVISUAL COLLABORATION SYSTEM AND METHOD WITH LATENCY MANAGEMENT FOR WIDE-AREA BROADCAST AND SOCIAL MEDIA-TYPE USER INTERFACE MECHANICS

CROSS-REFERENCE TO RELATED APPLICATION(S)

The present application claims priority of U.S. Provisional Patent application No. 62/685,727, filed Jun. 15, 2018. The present application is also a CIP of U.S. patent application Ser. No. 15/944,537, filed Apr. 3, 2018, entitled "AUDIOVISUAL COLLABORATION METHOD WITH LATENCY MANAGEMENT FOR WIDE-AREA BROADCAST," naming Holmberg, Hersh, Yang, Cook and Smith as inventors, which in turn claims priority to U.S. Provisional Application No. 62/480,610, filed Apr. 3, 2017. The entirety of each of the foregoing applications is incorporated herein by reference.

The present application is related to commonly-owned, co-pending U.S. application Ser. No. 16/107,351, filed Aug. 21, 2017, and entitled "Audio-Visual Effects System for Augmentation of Captured Performance based on Emotional Content Thereof" and to U.S. Pat. Nos. 9,866,731, 9,911,403 and 8,983,829.

BACKGROUND

Field of the Invention

The invention relates generally to capture, processing and/or broadcast of multi-performer audiovisual performances and, in particular, to techniques suitable for managing transmission latency for audiovisual content captured in the context of a near real-time audiovisual collaboration of multiple, geographically-distributed performers.

Description of the Related Art

The installed base of mobile phones, personal media players, and portable computing devices, together with media streamers and television set-top boxes, grows in sheer number and computational power each day. Hyper-ubiquitous and deeply entrenched in the lifestyles of people around the world, many of these devices transcend cultural and economic barriers. Computationally, these computing devices offer speed and storage capabilities comparable to engineering workstation or workgroup computers from less than ten years ago, and typically include powerful media processors, rendering them suitable for real-time sound synthesis and other musical applications. Partly as a result, some portable handheld devices, such as iPhone®, iPad®, iPod Touch® and other iOS® or Android devices, as well as media application platforms and set-top box (STB) type devices such as AppleTV® devices, support audio and video processing quite capably, while at the same time providing platforms suitable for advanced user interfaces. Indeed, applications such as the Smule Ocarina™, Leaf Trombone®, I Am T-Pain™, AutoRap®, Smule (fka Sing! Karaoke™), Guitar! By Smule®, and Magic Piano® apps available from Smule, Inc. have shown that advanced digital acoustic techniques may be delivered using such devices in ways that provide compelling musical experiences.

Smule (fka Sing! Karaoke™) implementations have previously demonstrated accretion of vocal performances captured on a non-real-time basis with respect to each other using geographically-distributed, handheld devices, as well as implementations where more tightly-coupled coordination between portable handheld devices and a local media application platform (e.g., in-room) is supported, typically with short-range, negligible-latency communications on a same local- or personal-area network segment. Improved techniques and functional capabilities are desired to extend an intimate sense of "now" or "liveness" to collaborative vocal performances, where the performers are separated by more significant geographic distances and notwithstanding non-negligible communication latencies between devices.

As researchers seek to transition their innovations to commercial applications deployable to modern handheld devices and media application platforms within the real-world constraints imposed by processor, memory and other limited computational resources thereof and/or within communications bandwidth and transmission latency constraints typical of wireless and wide-area networks, significant practical challenges present. For example, while applications such as Smule (fka Sing! Karaoke™) have demonstrated the promise of post-performance audiovisual mixes to simulate vocal duets or collaborative vocal performances of larger numbers of performers, creating a sense of now and live collaboration has proved elusive without physical co-location.

Improved techniques and functional capabilities are desired, particularly relative to management of communication latencies and captured audiovisual content in such a way that a combined audiovisual performance nonetheless can be disseminated (e.g., broadcast) in a manner that presents to recipients, listeners and/or viewers as a live interactive collaboration of geographically-distributed performers. Audience involvement and participation constructs that provide an intimate sense of "now" or "liveness" are also desired.

SUMMARY

It has been discovered that, despite practical limitations imposed by mobile device platforms and other media application execution environments, audiovisual performances, including vocal music, may be captured and coordinated with those of other users in ways that create compelling user and listener experiences. In some cases, the vocal performances of collaborating contributors are captured (together with performance synchronized video) in the context of a karaoke-style presentation of lyrics and in correspondence with audible renderings of a backing track. In some cases, vocals (and typically synchronized video) are captured as part of a live or unscripted performance with vocal interactions (e.g., a duet or dialog) between collaborating contributors. In either case, it is envisioned that non-negligible network communication latencies will exist between at least some of the collaborating contributors, particularly where those contributors are geographically separated. As a result, a technical challenge exists to manage latencies and the captured audiovisual content in such a way that a combined audiovisual performance nonetheless can be disseminated (e.g., broadcast) in a manner that presents to recipients, listeners and/or viewers as a live interactive collaboration.

In one technique for accomplishing this facsimile of live interactive performance collaboration, actual and non-negligible network communication latency is (in effect) masked in one direction between a guest and host performer and tolerated in the other direction. For example, a captured audiovisual performance of a guest performer on a "live show" internet broadcast of a host performer could include a guest+host duet sung in apparent real-time synchrony. In some cases, the guest could be a performer who has popularized a particular musical performance. In some cases, the guest could be an amateur vocalist given the opportunity to sing "live" (though remote) with the popular artist or group virtually "in studio" as (or with) the show's host. Notwithstanding a non-negligible network communication latency from guest-to-host involved in the conveyance of the guest's audiovisual contribution stream (perhaps 200-500 ms or more), the host performs in apparent synchrony with (though temporally lagged from, in an absolute sense) the guest and the apparently synchronously performed vocals are captured and mixed with the guest's contribution for broadcast or dissemination.

The result is an apparently live interactive performance (at least from the perspective of the host and the recipients, listeners and/or viewers of the disseminated or broadcast performance). Although the non-negligible network communication latency from guest-to-host is masked, it will be understood that latency exists and is tolerated in the host-to-guest direction. However, host-to-guest latency, while discernible (and perhaps quite noticeable) to the guest, need not be apparent in the apparently live broadcast or other dissemination. It has been discovered that lagged audible rendering of host vocals (or more generally, of the host's captured audiovisual performance) need not psychoacoustically interfere with the guest's performance.

Performance synchronized video may be captured and included in a combined audiovisual performance that constitutes the apparently live broadcast, wherein visuals may be based, at least in part, on time-varying, computationally-defined audio features extracted from (or computed over) captured vocal audio. In some cases or embodiments, these computationally-defined audio features are selective, over the course of a coordinated audiovisual mix, for particular synchronized video of one or more of the contributing vocalists (or prominence thereof).

Optionally, and in some cases or embodiments, vocal audio can be pitch-corrected in real-time at the guest performer's device (or more generally, at a portable computing device such as a mobile phone, personal digital assistant, laptop computer, notebook computer, pad-type computer or netbook, or on a content or media application server) in accord with pitch correction settings. In some cases, pitch correction settings code a particular key or scale for the vocal performance or for portions thereof. In some cases, pitch correction settings include a score-coded melody and/or harmony sequence supplied with, or for association with, the lyrics and backing tracks. Harmony notes or chords may be coded as explicit targets or relative to the score coded melody or even actual pitches sounded by a vocalist, if desired.

Using uploaded vocals captured at guest performer devices such as the aforementioned portable computing devices, a content server or service for the host can further mediate coordinated performances by manipulating and mixing the uploaded audiovisual content of multiple contributing vocalists for further broadcast or other dissemination. Depending on the goals and implementation of a particular system, in addition to video content, uploads may include pitch-corrected vocal performances (with or without harmonies), dry (i.e., uncorrected) vocals, and/or control tracks of user key and/or pitch correction selections, etc.

Synthesized harmonies and/or additional vocals (e.g., vocals captured from another vocalist at still other locations and optionally pitch-shifted to harmonize with other vocals) may also be included in the mix. Geocoding of captured vocal performances (or individual contributions to a combined performance) and/or listener feedback may facilitate animations or display artifacts in ways that are suggestive of a performance or endorsement emanating from a particular geographic locale on a user-manipulable globe. In this way, implementations of the described functionality can transform otherwise mundane mobile devices and living room or entertainment systems into social instruments that foster a unique sense of global connectivity, collaboration and community.

Audiovisual Livestream

In some embodiments in accordance with the present invention(s), a collaboration method for a livestream broadcast of a coordinated audiovisual work of first and second performers captured at respective geographically-distributed, first and second devices includes: (1) receiving at the second device, a media encoding of an audiovisual performance mixed with a backing audio track and including (i) vocal audio captured at the first device from a first one of the performers and (ii) video that is performance synchronized with the captured first performer vocals; (2) at the second device, audibly rendering the received mixed audio performance and capturing thereagainst vocal audio from a second one of the performers; (3) mixing the captured second performer vocal audio with the received mixed audio performance to provide a broadcast audiovisual mix that includes the captured vocal audio of the first and second performers and the backing audio track without apparent temporal lag therebetween; and (4) supplying the audiovisual broadcast mix to a service platform configured to livestream the broadcast audiovisual mix to plural recipient devices constituting an audience.

In some cases or embodiments, the performance synchronized video included in the received media encoding is captured in connection with the vocal capture at the first device, the method further includes capturing, at the second device, video that is performance synchronized with the captured second performer vocals, and the audiovisual broadcast mix is an audiovisual mix of captured audio and video of at least the first and second performers.

In some embodiments, the method further includes capturing, at the second device, second performer video that is performance synchronized with the captured second performer vocals; and compositing the second performer video with video for the first performer in the supplied audiovisual broadcast mix. In some cases or embodiments, the first and second performer video compositing includes, for at least some portions of the supplied audiovisual broadcast mix, a computational blurring of image frames of first and second performer video at a visual boundary therebetween.

In some embodiments, the method further includes dynamically varying in a course of the audiovisual broadcast mix relative visual prominence of one or the other of the first and second performers. In some cases or embodiments, the dynamic varying is, at least partially, in correspondence with time varying vocal part codings in an audio score corresponding to and temporally synchronized with the backing audio track. In some cases or embodiments, the dynamic varying is, at least partially, based on evaluation of a computationally defined audio feature of either or both of the first and second performer vocals.

In some cases or embodiments, the first device is associated with the second device as a current livestream guest, and the second device operates as a current livestream host, the current livestream host controlling association and dissociation of particular devices from the audience as the current livestream guest. In some cases or embodiments, the current livestream host selects from a queue of requests from the audience to associate as the current livestream guest. In some cases or embodiments, the first device operates in a livestream guest role and the second device operates in a livestream host role, the method further comprising either or both of: the second device releasing the livestream host role for assumption by another device; and the second device passing the livestream host role to a particular device selected from a set comprising the first device and the audience.

In some embodiments, the method further includes accessing a machine readable encoding of musical structure that includes at least musical section boundaries coded for temporal alignment with the vocal audio captured at the first and second devices; and applying a first visual effect schedule to at least a portion of audiovisual broadcast mix, wherein the applied visual effect schedule encodes differing visual effects for differing musical structure elements of the first audiovisual performance encoding and provides visual effect transitions in temporal alignment with at least some of the coded musical section boundaries.

In some cases or embodiments, the differing visual effects encoded by the applied visual effect schedule include for a given element thereof, one or more of: a particle-based effect or lens flare; transitions between distinct source videos; animations or motion of a frame within a source video; vector graphics or images of patterns or textures; and color, saturation or contrast. In some cases or embodiments, the associated musical structure encodes musical sections of differing types; and the applied visual effect schedule defines differing visual effects for different ones of the encoded musical sections. In some cases or embodiments, the associated musical structure encodes events or transitions; and the applied visual effect schedule defines differing visual effects for different ones of the encoded events or transitions. In some cases or embodiments, the associated musical structure encodes group parts, and the applied visual effect schedule is temporally selective for particular performance synchronized video in correspondence with the encoded musical structure.

In some embodiments, the method is performed, at least in part, on a handheld mobile device communicatively coupled to a content server or service platform. In some embodiments, the method is embodied, at least in part, as a computer program product encoding of instructions executable on the second device as part of a cooperative system including a content server or service platform to which a plurality of geographically-distributed, network-connected, vocal capture devices, including the second device, are communicatively coupled.

In some embodiments in accordance with the present invention(s), a system for dissemination of an apparently live broadcast of a joint performance of geographically-distributed first and second performers includes first and second devices coupled by a communication network with non-negligible peer-to-peer latency for transmission of audiovisual content. The first device is communicatively coupled to supply to the second device an audiovisual performance mixed with a backing audio track and including (1) vocal audio of the first performer captured against the backing audio track and (2) video that is performance synchronized therewith. The second device is communicatively configured to receive a media encoding of the mixed audiovisual performance and to audibly render at least audio portions of the mixed audiovisual performance, to capture thereagainst vocal audio of the second performer, and to mix the captured second performer vocal audio with the received mixed audiovisual performance for transmission as the apparently live broadcast.

In some cases or embodiments, the second device is further configured to capture second performer video that is performance synchronized with the captured second performer vocals and to composite the second performer video with video for the first performer in the supplied audiovisual broadcast mix. In some cases or embodiments, the first and second performer video compositing includes, for at least some portions of the supplied audiovisual broadcast mix, a computational blurring of image frames of first and second performer video at a visual boundary therebetween.

In some cases or embodiments, the first and second performer video compositing includes dynamically varying in a course of the audiovisual broadcast mix relative visual prominence of one or the other of the first and second performers. In some cases or embodiments, the dynamic varying is, at least partially, in correspondence with time varying vocal part codings in an audio score corresponding to and temporally synchronized with the backing audio track. In some cases or embodiments, the dynamic varying is, at least partially, based on evaluation of a computationally defined audio feature of either or both of the first and second performer vocals.

In some cases or embodiments, the first device is associated with the second device as a current livestream guest, and the second device operates as a current livestream host, the current livestream host controlling association and dissociation of particular devices from the audience as the current livestream guest. In some cases or embodiments, the current livestream host selects from a queue of requests from the audience to associate as the current livestream guest.

In some embodiments, the system further includes a video compositor that accesses a machine readable encoding of musical structure including at least musical section boundaries coded for temporal alignment with the vocal audio captured at the first and second devices and that applies a first visual effect schedule to at least a portion of audiovisual broadcast mix, wherein the applied visual effect schedule encodes differing visual effects for differing musical structure elements of the first audiovisual performance encoding and provides visual effect transitions in temporal alignment with at least some of the coded musical section boundaries. In some cases or embodiments, the video compositor is hosted either on the second device or on a content server or service platform through which the apparently live performance is supplied.

In some cases or embodiments, as part of a user interface visual on either or both of the first and second devices, for a current song selection, a different vocal part selection is presented for each of the performers; and responsive to, and in correspondence with, gestures by either or both of the first and second performers at the respective geographically-distributed devices, the vocal part selections are updated, wherein assignment of a particular vocal part selection to the respective first or second performers is changeable until one or the other of the first and second performers gestures a start of vocal capture on a respective geographically-distributed device, whereupon a then-current assignment of particular vocal part selections to the respective first or second performers is fixed for duration of capture of the coordinated multi-vocal performance.

Selfie Chat Mechanism for Social Media

In some embodiments in accordance with the present invention(s), a user interface method for social media includes (1) as part of a user interface visual on a touchscreen display of a client device, presenting on the touchscreen display, live video captured using a camera of the client device; (2) responsive to a first touchscreen gesture by a user of the client device, initiating capture of a snippet of the live video and presenting, as part of the user interface visual, a progress indication in correspondence with an accreting capture of the snippet; and (3) responsive to a second touchscreen gesture by the user of the client device, transmitting the captured snippet to a network-coupled service platform as a posting in multiuser social media thread.

In some cases or embodiments, the method further includes presenting the multiuser social media thread on the touchscreen display, the presented multiuser social media thread including the captured snippet together with posted temporally-ordered content from other users received via the network-coupled service platform, wherein the posted content from at least one other user includes one or more of text and captured snippet of video from the at least one other user.

In some cases or embodiments, the captured snippet is a fixed-length snippet, and the method further includes visually updating the progress indication in correspondence portion of the fixed-length snippet captured. In some cases or embodiments, the first touchscreen gesture is a maintained contact, by the user, with a first visually presented feature on the touchscreen display, and wherein the second touchscreen gesture includes release of the maintained contact. In some cases or embodiments, the first touchscreen gesture is a first tap-type contact, by the user, with a first visually presented feature on the touchscreen display, and wherein the second touchscreen gesture is a second tap-type contact following the first tap-type contact on the touchscreen display. In some cases or embodiments, the method further includes presenting the multiuser social media thread on the touchscreen display in correspondence with a livestreamed audiovisual broadcast mix.

AudioVisual Collaboration with User Part Arbitration

In some embodiments in accordance with the present invention(s), a method for capture of at least a portion of a coordinated multi-vocal performance of first and second performers at respective first and second geographically-distributed devices includes (1) as part of a user interface visual on either or both of the first and second devices, presenting for a current song selection, a different vocal part selection for each of the performers; and (2) responsive to, and in correspondence with, gestures by either or both of the first and second performers at the respective geographically-distributed devices, updating the vocal part selections, wherein assignment of a particular vocal part selection to the respective first or second performers is changeable until one or the other of the first and second performers gestures a start of vocal capture on a respective geographically-distributed device, whereupon a then-current assignment of particular vocal part selections to the respective first or second performers is fixed for duration of capture of the coordinated multi-vocal performance.

In some cases or embodiments, the method further includes updating the vocal part selections at the second device in correspondence with a gestured selection communicated from the first device; and supplying the first device with updates to the vocal part selections in correspondence with a gestured selection at the second device. In some cases or embodiments, the method further includes changing the current song selection and, in correspondence therewith, updating on either or both of the first and second devices the user interface visual. In some cases or embodiments, the change in current song selection is triggered by one or the other of the first and second performers on a respective one of the first and second devices.

In some cases or embodiments, the method further includes triggering the change in current song selection based on a periodic or recurring event. In some cases or embodiments, the change in current song selection selects from a library of song selections based on one or more of coded interests and performance history of either or both of the first and second performers.

In some cases or embodiments, beginning with the start of vocal capture, the method further includes receiving at the second device, a media encoding of a mixed audio performance (i) including vocal audio captured at the first device from a first one of the performers and (ii) mixed with a backing audio track for the current song selection; at the second device, audibly rendering the received mixed audio performance and capturing thereagainst vocal audio from a second one of the performers; and mixing the captured second performer vocal audio with the received mixed audio performance to provide a broadcast mix that includes the captured vocal audio of the first and second performers and the backing audio track without apparent temporal lag therebetween.

In some cases or embodiments, the method further includes, at the second device, visually presenting in correspondence with the audible rendering, lyrics and score-coded note targets for the current song selection, wherein the visually presented lyrics and note targets correspond the assignment of a particular vocal part at the start of vocal capture. In some cases or embodiments, the received media encoding includes video that is performance synchronized with the captured first performer vocals, wherein the method further includes capturing, at the host device, video that is performance synchronized with the captured second performer vocals, and wherein the broadcast mix is an audiovisual mix of captured audio and video of at least the first and second performers.

In some cases or embodiments, the method further includes capturing, at the host device, second performer video that is performance synchronized with the captured second performer vocals; and compositing the second performer video with video for the first performer in the supplied audiovisual broadcast mix. In some cases or embodiments, the method further includes supplying the broadcast mix to a service platform configured to livestream the broadcast mix to plural recipient devices constituting an audience.

BRIEF DESCRIPTION OF THE DRAWINGS

The present invention(s) are illustrated by way of examples and not limitation with reference to the accompanying figures, in which like references generally indicate similar elements or features.

FIG. 6 illustrates features of a mobile device that may serve as a platform for execution of software implementations of at least some audiovisual performance capture and/or livestream performance devices in accordance with some embodiments of the present invention(s).

FIGS. 9A, 9B and 9C illustrate a user part selection and coordination mechanism in which a song roulette and/or gestured selections by user-performers on geographically-distributed devices provide corresponding song and/or part selections on peer devices for a livestream performance in accordance with some embodiments of the present invention(s).

FIG. 10 is a network diagram that illustrates cooperation of exemplary devices in accordance with some embodiments of the present invention(s).

Figure 1:
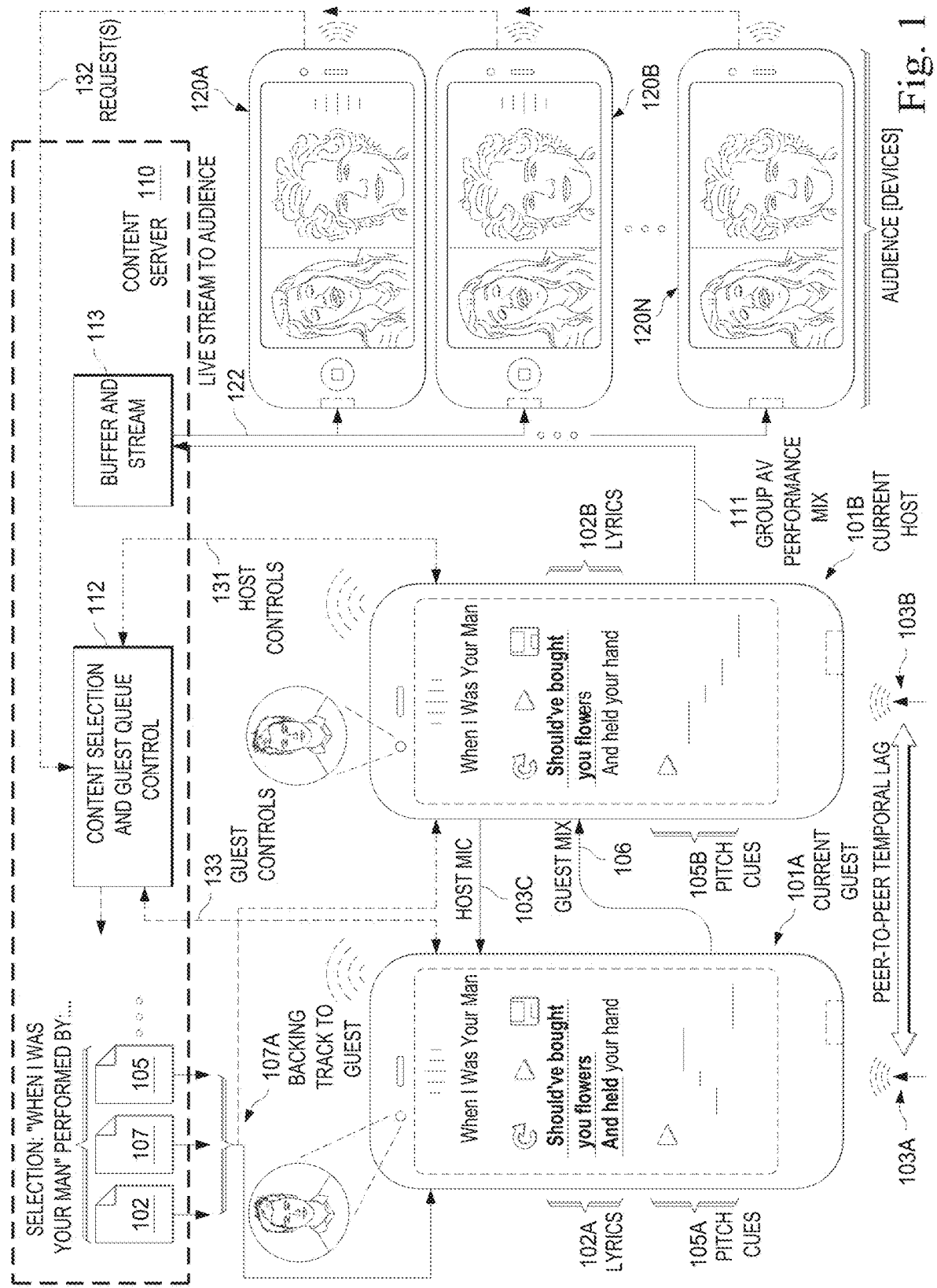
FIG. 1 depicts information flows amongst illustrative mobile phone-type portable computing devices in a host and guest configuration for livestreaming a duet-type group audiovisual performance in accordance with some embodiments of the present invention(s).

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention. Likewise, a multiplicity of data and control flows (including constituent signals or encodings) will be understood consistent with the descriptions notwithstanding illustration in the drawings of a single flow for simplicity or avoid complexity that might otherwise obscure description of the inventive concepts.

DESCRIPTION

Techniques have been developed to facilitate the livestreaming of group audiovisual performances. Audiovisual performances including vocal music are captured and coordinated with performances of other users in ways that can create compelling user and listener experiences. For example, in some cases or embodiments, duets with a host performer may be supported in a sing-with-the-artist style audiovisual livestream in which aspiring vocalists request or queue particular songs for a live radio show entertainment format. The developed techniques provide a communications latency-tolerant mechanism for synchronizing vocal performances captured at geographically-separated devices (e.g., at globally-distributed, but network-connected mobile phones or tablets or at audiovisual capture devices geographically separated from a live studio).

While audio-only embodiments are certainly contemplated, it is envisioned that livestream content will typically include performance-synchronized video captured in connection with vocals. In addition, while network-connected mobile phones are illustrated as audiovisual capture devices, it will be appreciated based on the description herein that audiovisual capture and viewing devices may include suitably-configured computers, smart TVs and/or living room style set-top box configurations, and even intelligent virtual assistance devices with audio and/or audiovisual capture devices or capabilities. Finally, while applications to vocal music are described in detail, it will be appreciated based on the description herein that audio or audiovisual capture applications need not be limited to vocal duets, but may be adapted to other forms of group performance in which one or more successive performances are accreted to a prior performance to produce a livestream.

In some cases, the vocal performances of collaborating contributors are captured (together with performance synchronized video) in the context of a karaoke-style presentation of lyrics and in correspondence with audible renderings of a backing track. In some cases, vocals (and typically synchronized video) are captured as part of a live or unscripted performance with vocal interactions (e.g., a duet or dialog) between collaborating contributors. In each case, it is envisioned that non-negligible network communication latencies will exist between at least some of the collaborating contributors, particularly where those contributors are geographically separated. As a result, a technical challenge exists to manage latencies and the captured audiovisual content in such a way that a combined audio visual performance can nonetheless be disseminated (e.g., broadcast) in a manner that presents to recipients, listeners and/or viewers as a live interactive collaboration.

In one technique for accomplishing this facsimile of live interactive performance collaboration, actual and non-negligible network communication latency is (in effect) masked in one direction between a guest and host performer and tolerated in the other direction. For example, a captured audiovisual performance of a guest performer on a "live show" Internet broadcast of a host performer could include a guest+host duet sung in apparent real-time synchrony. In some cases, the host could be a performer who has popularized a particular musical performance. In some cases, the guest could be an amateur vocalist given the opportunity to sing "live" (though remote) with the popular artist or group "in studio" as (or with) the show's host. Notwithstanding a non-negligible network communication delay from guest-to-host (perhaps 200-500 ms or more) to convey the guest's audiovisual contribution, the host performs in apparent synchrony with (though temporally lagged from, in an absolute sense) the guest and the apparently synchronously performed vocals are captured and mixed with the guest's contribution for broadcast or dissemination.

The result is an apparently live interactive performance (at least from the perspective of the host and the recipients, listeners and/or viewers of the disseminated or broadcast performance). Although the non-negligible network communication latency from guest-to-host is masked, it will be understood that latency exists and is tolerated in the host-to-guest direction. However, host-to-guest latency, while discernible (and perhaps quite noticeable) to the guest, need not be apparent in the apparently live broadcast or other dissemination. It has been discovered that lagged audible rendering of host vocals (or more generally, of the host's captured audiovisual performance) need not psychoacoustically interfere with the guest's performance.

Although much of the description herein presumes, for purposes of illustration, a fixed host performer on a particular host device, it will be appreciated based on the description herein that some embodiments in accordance with the present invention(s) may provide host/guest control logic that allows a host to "pass the mic" such that a new user (in some cases a user selected by the current host and other cases, a user who "picks up the mic" after the current host "drops the mic") may take over as host. Likewise, it will be appreciated based on the description herein that some embodiments in accordance with the present invention(s) may provide host/guest control logic that queues guests (and/or aspiring hosts) and automatically assigns queued users to appropriate roles.

In some cases or embodiments, vocal audio of individual host- and guest-role performers is captured together with performance synchronized video in a karaoke-style user interface framework and coordinated with audiovisual contributions of the other users to form duet-style or glee club-style group audiovisual performances. For example, the vocal performances of individual users may be captured (together with performance synchronized video) on mobile devices, television-type display and/or set-top box equipment in the context of karaoke-style presentations of lyrics in correspondence with audible renderings of a backing track. In some cases or embodiments, score-coded continuous pitch correction may be provided as well as user selectable audio and/or video effects. Consistent with the foregoing, but without limitation as to any particular embodiment claimed, karaoke-style vocal performance capture using portable handheld devices provides illustrative context.

Karaoke-Style Vocal Performance Capture

Although embodiments of the present invention are not limited thereto, pitch-corrected, karaoke-style, vocal capture using mobile phone-type and/or television-type audiovisual equipment provides a useful descriptive context. For example, in some embodiments such as illustrated in FIG. 1, iPhone™ handhelds available from Apple Inc. (or more generally, handhelds 101A, 101B operating as guest and host devices, respectively) execute software that operates in coordination with a content server 110 to provide vocal capture. The configuration optionally provides continuous real-time, score-coded pitch correction and harmonization of the captured vocals. Performance synchronized video may also be captured using a camera provided by, or in connection with, a computer, a television or other audiovisual equipment (not specifically shown) or connected set-top box equipment such as an Apple TV™ device. In some embodiments, performance synchronized video may be captured using an on-board camera provided by handheld paired with connected set-top box equipment. Suitable techniques are detailed in commonly-owned, co-pending U.S. patent application Ser. No. 15/337,866, filed Oct. 28, 2016, naming Hersh, Shimmin, Yang, and Cook as inventors, entitled "Audiovisual Media Application Platform with Wireless Handheld Audiovisual Input," the entirety of which is incorporated herein by reference.

In the illustration of FIG. 1, a current host user of current host device 101B at least partially controls the content of a live stream 122 that is buffered for, and streamed to, an audience on devices 120A, 120B . . . 120N. In the illustrated configuration, a current guest user of current guest device 101A contributes to the group audiovisual performance mix 111 that is supplied (eventually via content server 110) by current host device 101B as live stream 122. Although devices 120A, 120B . . . 120N and, indeed, current guest and host devices 101A, 101B are, for simplicity, illustrated as handheld devices such as mobile phones, persons of skill in the art having benefit of the present disclosure will appreciate that any given member of the audience may receive livestream 122 on any suitable computer, smart television, tablet, via a set-top box or other streaming media capable client.

Content that is mixed to form group audiovisual performance mix 111 is captured, in the illustrated configuration, in the context of karaoke-style performance capture wherein lyrics 102, optional pitch cues 105 and, typically, a backing track 107 are supplied from content server 110 to either or both of current guest device 101A and current host device 101B. A current host (on current host device 101B) typically exercises ultimate control over the live stream, e.g., by selecting a particular user (or users) from the audience to act as the current guest(s), by selecting a particular song from a request queue (and/or vocal parts thereof for particular users), and/or by starting, stopping or pausing the group AV performance. Once the current host selects or approves a guest and/or song, the guest user may (in some embodiments) start/stop/pause the roll of backing track 107A for local audible rendering and otherwise control the content of guest mix 106 (backing track roll mixed with captured guest audiovisual content) supplied to current host device 101B. Roll of lyrics 102A and optional pitch cues 105A at current guest device 101A is in temporal correspondence with the backing track 107A, and is likewise subject start/stop/pause control by the current guest. In some cases or situations, backing audio and/or video may be rendered from a media store such as an iTunes™ library resident or accessible from a handheld, set-top box, etc.

Typically, song requests 132 are audience-sourced and conveyed by signaling paths to content selection and guest queue control logic 112 of content server 110. Host controls 131 and guest controls 133 are illustrated as bi-directional signaling paths. Other queuing and control logic configurations consistent with the operations described, including host or guest controlled queueing and/or song selection, will be appreciated based on the present disclosure.

In the illustrated configuration of FIG. 1, and notwithstanding a non-negligible temporal lag (typically 100-250 ms, but possibly more), current host device 101B receives and audibly renders guest mix 106 as a backing track against which the current host's audiovisual performance are captured at current host device 101B. Roll of lyrics 102B and optional pitch cues 105B at current host device 101B is in temporal correspondence with the backing track, here guest mix 106. To facilitate synchronization to the guest mix 106 in view of temporal lag in the peer-to-peer communications channel between current guest device 101A and current host device 101B as well as for guest-side start/stop/pause control, marker beacons may be encoded in the guest mix to provide the appropriate phase control of lyrics 102B and optional pitch cues 105B on screen. Alternatively, phase analysis of any backing track 107A included in guest mix 106 (or any bleed through, if the backing track is separately encoded or conveyed) may be used to provide the appropriate phase control of lyrics 102B and optional pitch cues 105B on screen at current host device 101B.

It will be understood that temporal lag in the peer-to-peer communications channel between current guest device 101A and current host device 101B affects both guest mix 106 and communications in the opposing direction (e.g., host mic 103C signal encodings). Any of a variety of communications channels may be used to convey audiovisual signals and controls between current guest device 101A and current host device 101B, as well as between the guest and host devices 101A, 101B and content server 110 and between audience devices 120A, 120B ... 120N and content server 110. For example, respective telecommunications carrier wireless facilities and/or wireless local area networks and respective wide-area network gateways (not specifically shown) may provide communications to and from devices 101A, 101B, 120A, 120B ... 120N. Based on the description herein, persons of skill in the art will recognize that any of a variety of data communications facilities, including 802.11 Wi-Fi, Bluetooth™, 4G-LTE, 5G, or other communications, wireless, wired data networks, wired or wireless audiovisual interconnects such as in accord with HDMI, AVI, Wi-Di standards or facilities may employed, individually or in combination to facilitate communications and/or audiovisual rendering described herein.

User vocals 103A and 103B are captured at respective handhelds 101A, 101B, and may be optionally pitch-corrected continuously and in real-time and audibly rendered mixed with the locally-appropriate backing track (e.g., backing track 107A at current guest device 101A and guest mix 106 at current host device 101B) to provide the user with an improved tonal quality rendition of his/her own vocal performance. Pitch correction is typically based on score-coded note sets or cues (e.g., the pitch and harmony cues 105A, 105B visually displayed at current guest device 101A and at current host device 101B, respectively), which provide continuous pitch-correction algorithms executing on the respective device with performance-synchronized sequences of target notes in a current key or scale. In addition to performance-synchronized melody targets, score-coded harmony note sequences (or sets) provide pitch-shifting algorithms with additional targets (typically coded as offsets relative to a lead melody note track and typically scored only for selected portions thereof) for pitch-shifting to harmony versions of the user's own captured vocals. In some cases, pitch correction settings may be characteristic of a particular artist such as the artist that performed vocals associated with the particular backing track.

In general, lyrics, melody and harmony track note sets and related timing and control information may be encapsulated in an appropriate container or object (e.g., in a Musical Instrument Digital Interface, MIDI, or Java Script Object Notation, json, type format) for supply together with the backing track(s). Using such information, devices 101A and 101B (as well as associated audiovisual displays and/or set-top box equipment, not specifically shown) may display lyrics and even visual cues related to target notes, harmonies and currently detected vocal pitch in correspondence with an audible performance of the backing track(s) so as to facilitate a karaoke-style vocal performance by a user. Thus, if an aspiring vocalist selects "When I Was Your Man" as popularized by Bruno Mars, your_man.json and your_man.m4a may be downloaded from the content server (if not already available or cached based on prior download) and, in turn, used to provide background music, synchronized lyrics and, in some situations or embodiments, score-coded note tracks for continuous, real-time pitch-correction while the user sings. Optionally, at least for certain embodiments or genres, harmony note tracks may be score coded for harmony shifts to captured vocals. Typically, a captured pitch-corrected (possibly harmonized) vocal performance together with performance synchronized video is saved locally, on the handheld device or set-top box, as one or more audiovisual files and is subsequently compressed and encoded for communication (e.g., as guest mix 106 or group audiovisual performance mix 111 or constituent encodings thereof) to content server 110 as an MPEG-4 container file. MPEG-4 is one suitable standard for the coded representation and transmission of digital multimedia content for the Internet, mobile networks and advanced broadcast applications. Other suitable codecs, compression techniques, coding formats and/or containers may be employed if desired.

As will be appreciated by persons of skill in the art having benefit of the present disclosure, performances of multiple vocalists (including performance synchronized video) may be accreted and combined, such as to form a duet-style performance, glee club, or vocal jam session. In some embodiments of the present invention, social network constructs may at least partially supplant or inform host control of the pairings of geographically-distributed vocalists and/or formation of geographically-distributed virtual glee clubs. For example, relative to FIG. 1, individual vocalists may perform as current host and guest users in a manner captured (with vocal audio and performance synchronized video) and eventually streamed as a live stream 122 to an audience. Such captured audiovisual content may, in turn, be distributed to social media contacts of the vocalist, members of the audience etc., via an open call mediated by the content server. In this way, the vocalists themselves, members of the audience (and/or the content server or service platform on their behalf) may invite others to join in a coordinated audiovisual performance, or as members of an audience or guest queue.

Where supply and use of backing tracks is illustrated and described herein, it will be understood, that vocals captured, pitch-corrected (and possibly, though not necessarily, harmonized) may themselves be mixed (as with guest mix 106) to produce a "backing track" used to motivate, guide or frame subsequent vocal capture. Furthermore, additional vocalists may be invited to sing a particular part (e.g., tenor, part B in duet, etc.) or simply to sing, the subsequent vocal capture device (e.g., current host device 101B in the configuration of FIG. 1) may pitch shift and place their captured vocals into one or more positions within a duet or virtual glee club. These and other aspects of performance accretion are described (for a content server mediated embodiment) in commonly-owned, U.S. Pat. No. 8,983,829, entitled "COORDINATING AND MIXING VOCALS CAPTURED FROM GEOGRAPHICALLY DISTRIBUTED PERFORMERS," and naming Cook, Lazier, Lieber, and Kirk as inventors, which is incorporated by reference herein.

Synchronization Methods

Based on the description herein, persons of skill in the art will appreciate a variety of host-guest synchronization methods that tolerate non-negligible temporal lag in the peer-to-peer communications channel between guest device 101A and host device 101B. As illustrated in the context of FIG. 1, the backing track (e.g., backing track 107A) can provide the synchronization timeline for temporally-phased vocal capture performed at the respective peer devices (guest device 101A and host device 101B) and minimize (or eliminate) the perceived latency for the users thereof.

Figure 2:
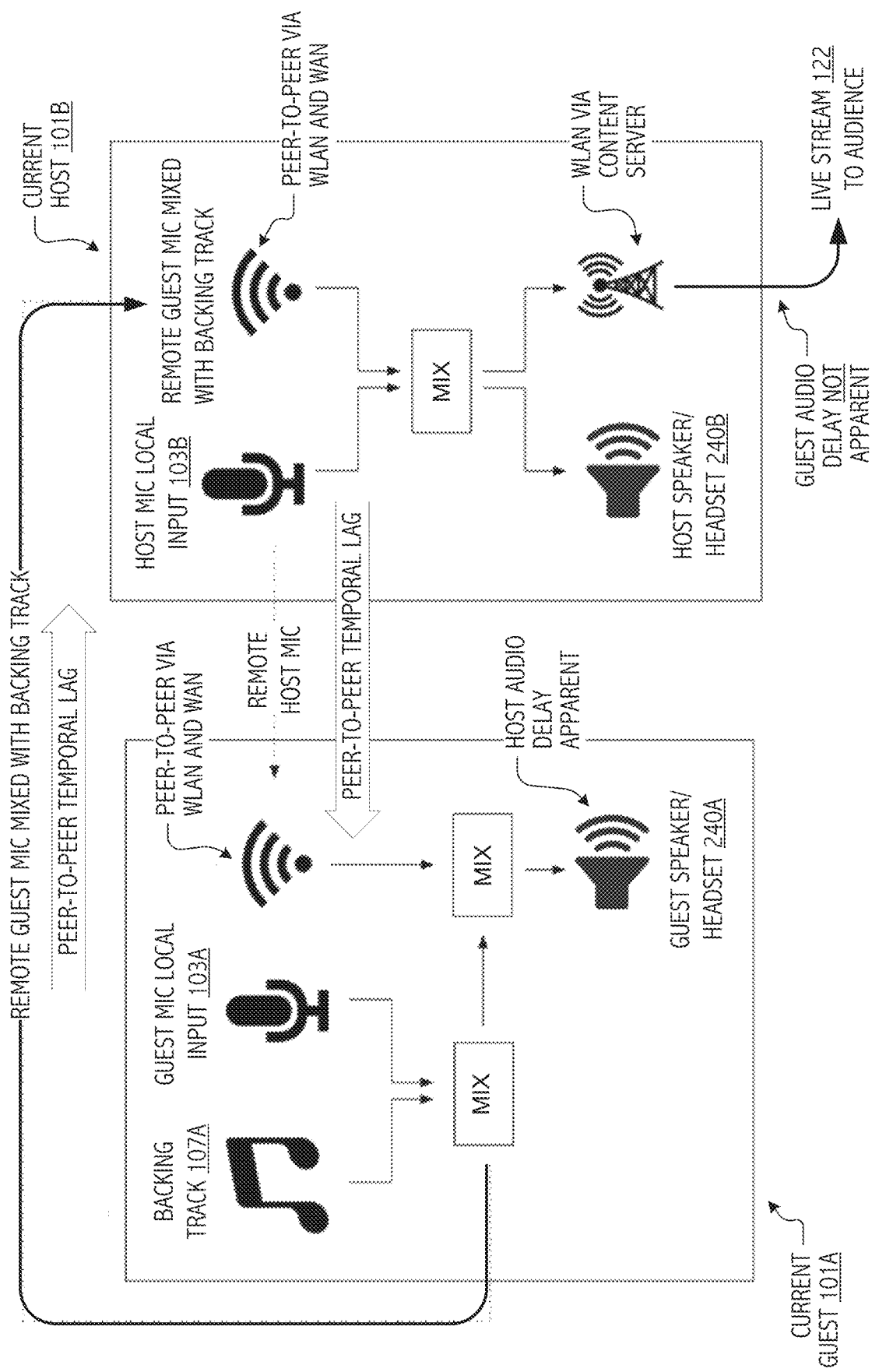
FIG. 2 is a flow graph depicting the flow of audio signals captured and processed at respective guest and host devices coupled in a "host sync" peer-to-peer configuration for generation of a group audiovisual performance livestream in accordance with some embodiments of the present invention(s).

FIG. 2 is a flow graph depicting the flow of audio signals captured and processed at respective guest and host devices coupled in a "host sync" peer-to-peer configuration for generation of a group audiovisual performance livestream in accordance with some embodiments of the present invention(s). Although FIG. 2 (and later, FIG. 3) each emphasize in the form of a teaching example the audio signal/data components and flows that provide synchronization and temporal alignment for an apparently live performance, a person of skill in the art having benefit of the present disclosure will appreciate that corresponding audio performance synchronized video may be captured (as in FIG. 1) and that corresponding video signal/data components and flows may, in like manner, be conveyed between guest and host devices, though not explicitly shown in FIGS. 2 and 3.

More specifically, FIG. 2 illustrates how an exemplary configuration of guest and host devices 101A and 101B (recall FIG. 1) and audiovisual signal flows therebetween (e.g., guest mix 106 and host mic audio 103C) during a peer-to-peer session provide a user experience in which the host device vocalist (at host device 1018) always hears guest vocals (captured from guest mic local input 103A) and backing track 107A in perfect synchronization. While the guest will perceive the host's accreted vocals delayed (in the mix supplied at guest speaker or headset 240A) by a full audio round-trip-travel (RTT) delay, the audio stream (including the remote guest mic mixed with the backing track) supplied to the host device 101B and mixed as the livestreamed (122) multi-vocal performance exhibit zero (or negligible) latency to the host vocalist or to the audience.

A key to masking actual latencies is to include track 107A in the audio mix suppled from guest device 101A and to the broadcaster's device, host device 101B, This audio flow ensures that the guest's voice and backing track is always synced from the broadcaster's point of view (based on audible rendering at host speaker or headset 240B. The guest may still perceive that the broadcaster is singing slightly out of sync if the network delay is significant. However, as long as the guest focuses on singing in time with the backing track instead of the host's slightly delayed voice, the multi-vocal mix of host vocals with guest vocals and the backing track is in sync when livestreamed to an audience.

Figure 3:
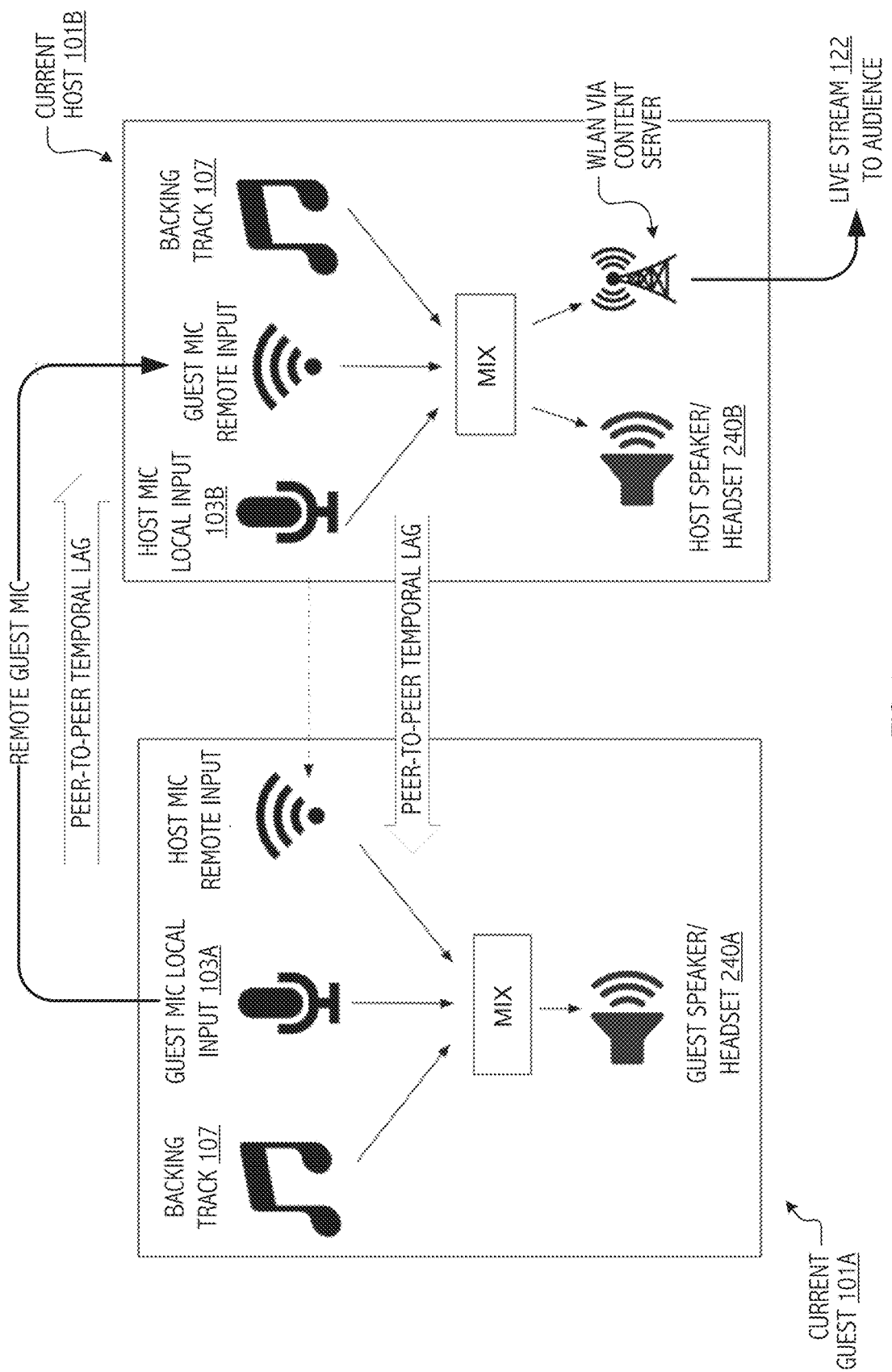
FIG. 3 is a flow graph depicting the flow of audio signals captured and processed at respective guest and host devices coupled in a "shared latency" peer-to-peer configuration for generation of a group audiovisual performance livestream in accordance with some embodiments of the present invention(s).

FIG. 3 is a flow graph depicting the flow of audio signals captured and processed at respective guest and host devices coupled in an alternative "shared latency" peer-to-peer configuration for generation of a group audiovisual performance livestream in accordance with some embodiments of the present invention(s). More specifically, FIG. 3 illustrates how an exemplary configuration of guest and host devices 101A and 101B (recall FIG. 1) and audiovisual signal flows therebetween (e.g., guest mix 106 and host mic audio 103C) during a peer-to-peer session combine to limit the guest and host vocalist's perception of the other vocalist's audio delay to just a one-way lag (nominally one half of the full audio round-trip-travel delay) behind the backing track.

This limited perception of delay is accomplished by playing the backing track locally on both devices, and working to keep them in sync in real-time. The guest device 101A sends periodic timing messages to the host containing the current position in the song, and the host device 101B adjusts the playback position of the song accordingly.

We have experimented with two different approaches to keeping the backing tracks in sync on the two devices (guest and host devices 101A and 101B):

Method 1: We adjust playback position we receive on the host-side by the one-way network delay, which is approximated as the network RTT/2.

Method 2: We synchronize the clocks of the two devices using network time protocol (NTP). This way we don't need to adjust the timing messages based on the one-way network delay, we simply add an NTP time stamp to each song timing message.

For "shared latency" configurations, method 2 has proven more stable than method 1. As an optimization, to avoid excessive timing adjustments, the host only updates the backing track playback position if we are currently more than 50 ms off from the guest's backing track playback position.

As described herein, though video signal/data components may not be specifically illustrated in all drawings, a person of skill in the art having benefit of the present disclosure will understand that performance synchronized video may also be conveyed in audiovisual data encodings that include the more explicitly illustrated audio and in flows analogous to those more explicitly illustrated for audio signal/data components. Just as audio signals are captured, conveyed and mixed, video captured at respective devices is composited in correspondence with the audio with which it is performance synchronized as a temporal alignment and distributed performer synchronization baseline. Video compositing is typically performed at the host device, but in some cases may be performed using facilities of a content server or service platform (recall FIG. 1). In some embodiments, computer readable encodings of musical structure may guide the compositing function, affecting selection, visual placement and/or prominence of performance synchronized video in the apparently live performance. In general, selection, visual placement and/or prominence may be in correspondence with score-coded musical structure such as group (or duet A/B) parts, musical sections, melody/harmony positions of captured or pitch-shifted audio and/or with computationally determined audio features of the vocal audio captured at guest or host device, or both.

Score-Coded Pitch Tracks

Figure 4:
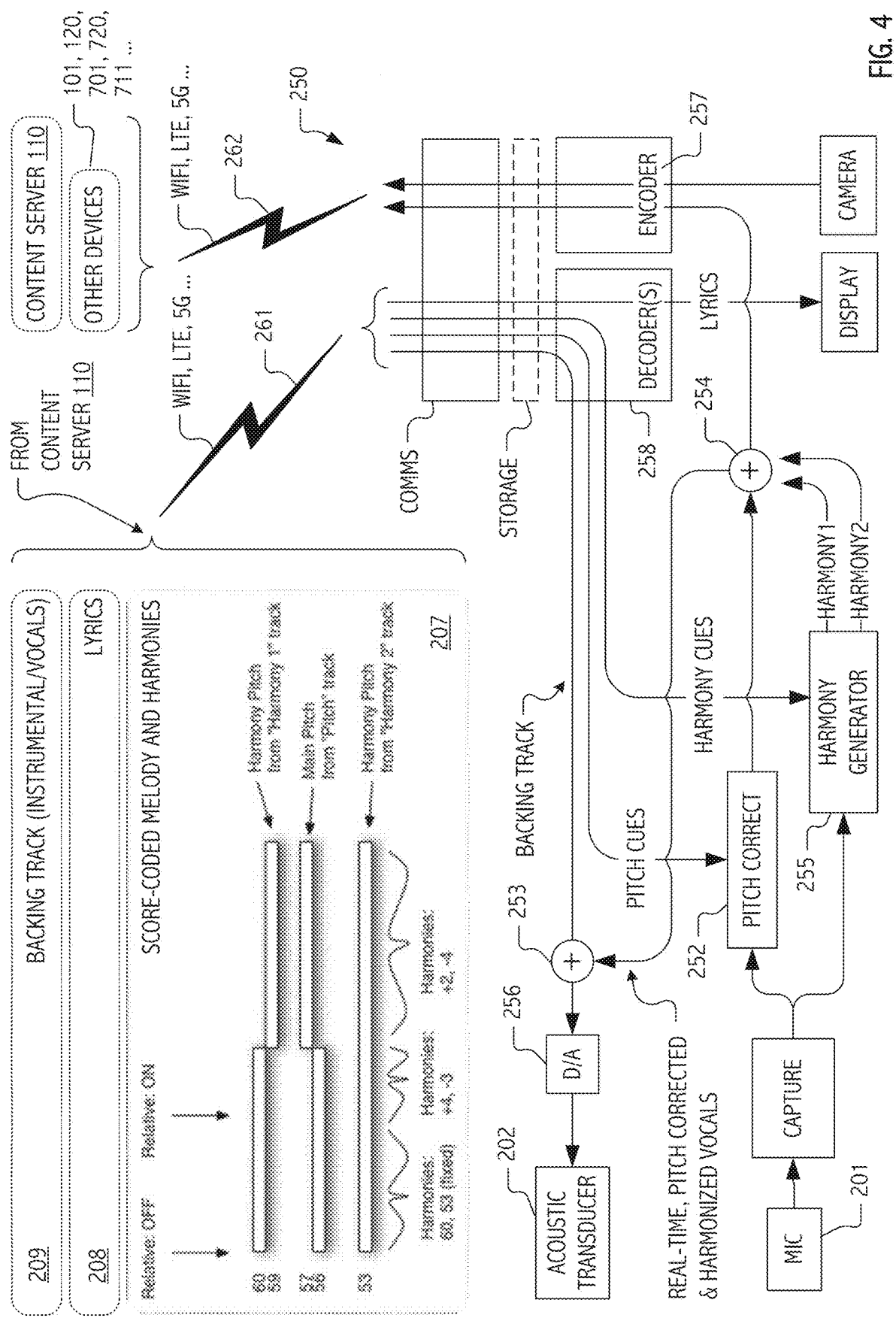
FIG. 4 is a flow diagram illustrating, for an audiovisual performance captured at a guest or host device in accordance with some embodiments of the present invention(s), optional real-time continuous pitch-correction and harmony generation signal flows that may be performed based on score-coded pitch correction settings.

FIG. 4 is a flow diagram illustrating real-time continuous score-coded pitch-correction and harmony generation for a captured vocal performance in accordance with some embodiments of the present inventions). In the illustrated configuration, a user/vocalist (e.g., the guest or host vocalist at guest device 101A or host device 101B, recall FIG. 1) sings along with a backing track karaoke style. In the case of the guest vocalist at the current guest device 101A, the operant backing track is backing track 107A, whereas for the host vocalist at the current host device 101B, the operant backing track is guest mix 106 which, at least in embodiments employing the "host sync" method, conveys the original backing track mixed with guest vocals. In either case, vocals captured (251) from a microphone input 201 may optionally be continuously pitch-corrected (252) and harmonized (255) in real-time for mix (253) with the operant backing track audibly rendered at one or more acoustic transducers 202.

Both pitch correction and added harmonies are chosen to correspond to a score 207, which in the illustrated configuration, is wirelessly communicated (261) to the device(s) (e.g., from content server 110 to guest device 101A or via guest device 101A to host device 101B, recall FIG. 1) on which vocal capture and pitch-correction is to be performed, together with lyrics 208 and an audio encoding of the operant backing track 209 (e.g., backing track 107A or guest mix 106). In some cases or embodiments, content selection and guest queue control logic 112 is selective for melody or harmony note selections at the respective guest and host devices 101A and 101B.

In some embodiments of techniques described herein, the note (in a current scale or key) that is closest to that sounded by the user/vocalist is determined based on score 207. While this closest note may typically be a main pitch corresponding to the score-coded vocal melody, it need not be. Indeed, in some cases, the user/vocalist may intend to sing harmony and the sounded notes may more closely approximate a harmony track.

Audiovisual Capture at Handheld Device

Figure 5:
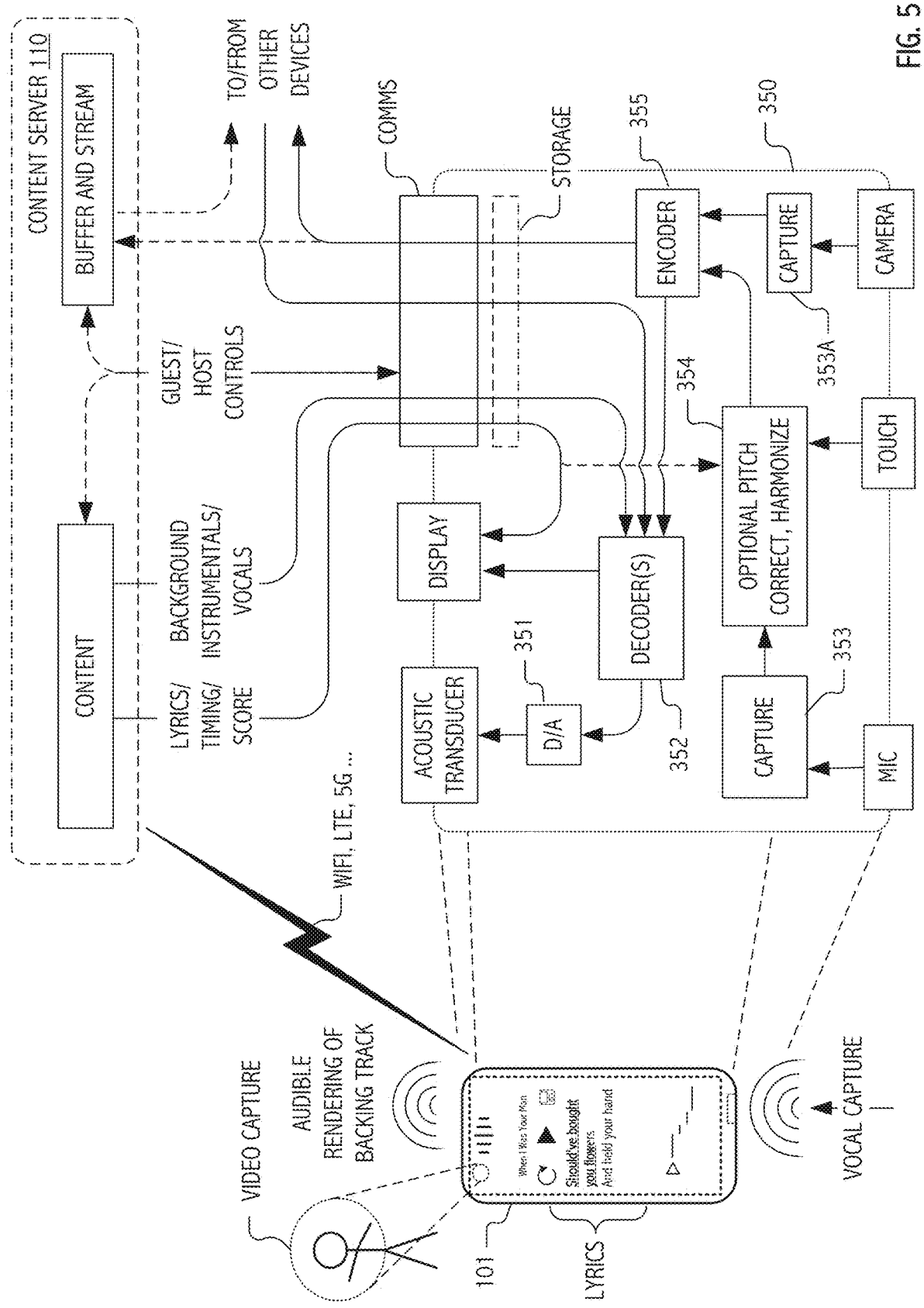
FIG. 5 is a functional block diagram of hardware and software components executable at an illustrative mobile phone-type portable computing device to facilitate processing and communication of a captured audiovisual performance for use in a multi-vocalist livestreaming configuration of network-connected devices in accordance with some embodiments of the present invention(s).

Although performance synchronized video capture need not be supported in all embodiments, handheld device 101 (e.g., current guest device 101A or current host device 101B, recall FIG. 1) may itself capture both vocal audio and performance synchronized video, Thus, FIG. 5 illustrates basic signal processing flows (350) in accord with certain implementations suitable for a mobile phone-type handheld device 101 to capture vocal audio and performance synchronized video, to generate pitch-corrected and optionally harmonized vocals for audible rendering (locally and/or at a remote target device), and to communicate with a content server or service platform 110.

Based on the description herein, persons of ordinary skill in the art will appreciate suitable allocations of signal processing techniques (sampling, filtering, decimation, etc.) and data representations to functional blocks (e.g., decoder(s) 352, digital-to-analog (D/A) converter 351, capture 353, 353A and encoder 355) of a software executable to provide signal processing flows 350 illustrated in FIG. 5. Likewise, relative to FIG. 4, the signal processing flows 250 and illustrative score coded note targets (including harmony note targets), persons of ordinary skill in the art will appreciate suitable allocations of signal processing techniques and data representations to functional blocks and signal processing constructs (e.g., decoder(s) 258, capture 251, digital-to-analog (D/A) converter 256, mixers 253, 254, and encoder 257) that may be implemented at least in part as software executable on a handheld or other portable computing device.

As will be appreciated by persons of ordinary skill in the art, pitch-detection and pitch-correction have a rich technological history in the music and voice coding arts. Indeed, a wide variety of feature picking, time-domain and even frequency-domain techniques have been employed in the art and may be employed in some embodiments in accord with the present invention. With this in mind, and recognizing that multi-vocalist synchronization techniques in accordance with the present invention(s) are generally independent of any particular pitch-detection or pitch-correction technology, the present description does not seek to exhaustively inventory the wide variety of signal processing techniques that may be suitable in various design or implementations in accord with the present description. Instead, we simply note that in some embodiments in accordance with the present inventions, pitch-detection methods calculate an average magnitude difference function (AMDF) and execute logic to pick a peak that corresponds to an estimate of the pitch period. Building on such estimates, pitch shift overlap add (PSOLA) techniques are used to facilitate resampling of a waveform to produce a pitch-shifted variant while reducing aperiodic effects of a splice. Specific implementations based on AMDF/PSOLA techniques are described in greater detail in commonly-owned, U.S. Pat. No. 8,983,829, entitled "COORDINATING AND MIXING VOCALS CAPTURED FROM GEOGRAPHICALLY DISTRIBUTED PERFORMERS," and naming Cook, Lazier, Lieber, and Kirk as inventors.

An Exemplary Mobile Device

FIG. 6 illustrates features of a mobile device that may serve as a platform for execution of software implementations in accordance with some embodiments of the present invention. More specifically, FIG. 6 is a block diagram of a mobile device 400 that is generally consistent with commercially-available versions of an iPhone-™ mobile digital device. Although embodiments of the present invention are certainly not limited to iPhone deployments or applications (or even to iPhone-type devices), the iPhone device platform, together with its rich complement of sensors, multimedia facilities, application programmer interfaces and wireless application delivery model, provides a highly capable platform on which to deploy certain implementations. Based on the description herein, persons of ordinary skill in the art will appreciate a wide range of additional mobile device platforms that may be suitable (now or hereafter) for a given implementation or deployment of the inventive techniques described herein.

Summarizing briefly, mobile device 400 includes a display 402 that can be sensitive to haptic and/or tactile contact with a user. Touch-sensitive display 402 can support multi-touch features, processing multiple simultaneous touch points, including processing data related to the pressure, degree and/or position of each touch point. Such processing facilitates gestures and interactions with multiple fingers and other interactions. Of course, other touch-sensitive display technologies can also be used, e.g., a display in which contact is made using a stylus or other pointing device.

Typically, mobile device 400 presents a graphical user interface on the touch-sensitive display 402, providing the user access to various system objects and for conveying information. In some implementations, the graphical user interface can include one or more display objects 404, 406. In the example shown, the display objects 404, 406, are graphic representations of system objects. Examples of system objects include device functions, applications, windows, files, alerts, events, or other identifiable system objects. In some embodiments of the present invention, applications, when executed, provide at least some of the digital acoustic functionality described herein.

Typically, the mobile device 400 supports network connectivity including, for example, both mobile radio and wireless internetworking functionality to enable the user to travel with the mobile device 400 and its associated network-enabled functions. In some cases, the mobile device 400 can interact with other devices in the vicinity (e.g., via Wi-Fi, Bluetooth, etc.). For example, mobile device 400 can be configured to interact with peers or a base station for one or more devices. As such, mobile device 400 may grant or deny network access to other wireless devices.

Mobile device 400 includes a variety of input/output (I/O) devices, sensors and transducers. For example, a speaker 460 and a microphone 462 are typically included to facilitate audio, such as the capture of vocal performances and audible rendering of backing tracks and mixed pitch-corrected vocal performances as described elsewhere herein. In some embodiments of the present invention, speaker 460 and microphone 662 may provide appropriate transducers for techniques described herein. An external speaker port 464 can be included to facilitate hands-free voice functionalities, such as speaker phone functions. An audio jack 466 can also be included for use of headphones and/or a microphone. In some embodiments, an external speaker and/or microphone may be used as a transducer for the techniques described herein.

Other sensors can also be used or provided. A proximity sensor 468 can be included to facilitate the detection of user positioning of mobile device 400. In some implementations, an ambient light sensor 470 can be utilized to facilitate adjusting brightness of the touch-sensitive display 402. An accelerometer 472 can be utilized to detect movement of mobile device 400, as indicated by the directional arrow 474. Accordingly, display objects and/or media can be presented according to a detected orientation, e.g., portrait or landscape. In some implementations, mobile device 400 may include circuitry and sensors for supporting a location determining capability, such as that provided by the global positioning system (GPS) or other positioning systems (e.g., systems using Wi-Fi access points, television signals, cellular grids, Uniform Resource Locators (URLs)) to facilitate geocodings described herein. Mobile device 400 also includes a camera lens and imaging sensor 480. In some implementations, instances of a camera lens and sensor 480 are located on front and back surfaces of the mobile device 400. The cameras allow capture still images and/or video for association with captured pitch-corrected vocals.

Mobile device 400 can also include one or more wireless communication subsystems, such as an 802.11b/g/n/ac communication device, and/or a Bluetooth™ communication device 488. Other communication protocols can also be supported, including other 802.x communication protocols (e.g., WiMax, 3G), fourth generation protocols and modulations (4G-LTE) and beyond (e.g., 5G), code division multiple access (CDMA), global system for mobile communications (GSM), Enhanced Data GSM Environment (EDGE), etc. A port device 490, e.g., a Universal Serial Bus (USB) port, or a docking port, or some other wired port connection, can be included and used to establish a wired connection to other computing devices, such as other communication devices 400, network access devices, a personal computer, a printer, or other processing devices capable of receiving and/or transmitting data. Port device 490 may also allow mobile device 400 to synchronize with a host device using one or more protocols, such as, for example, the TCP/IP, HTTP, UDP and any other known protocol.

User Interface Examples

Figure 7B:
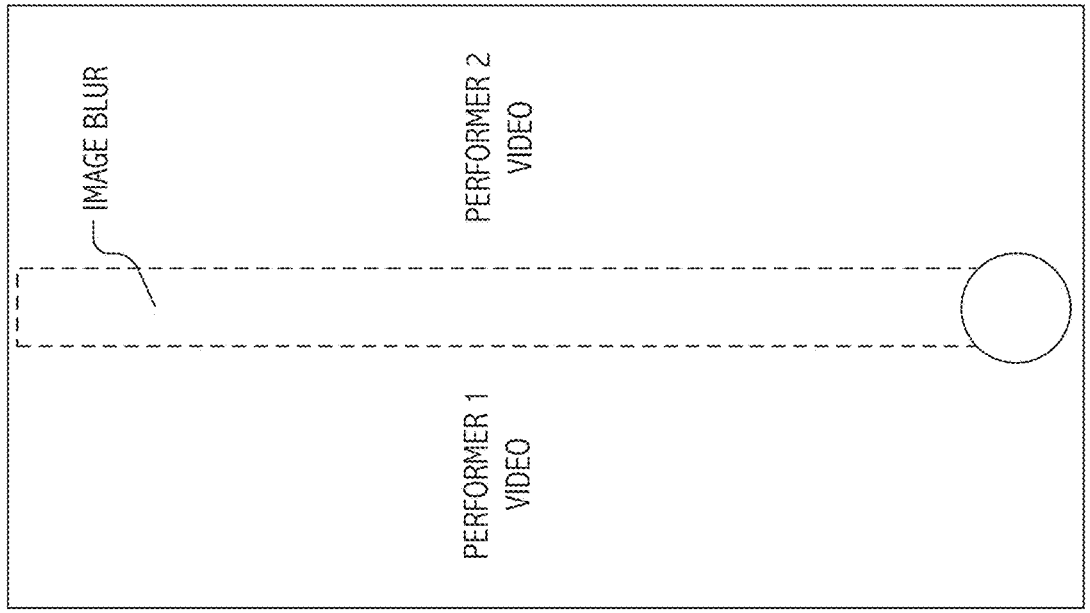
FIGS. 7A and 7B illustrate a video presentation of livestream content for which a compositing of images for first and second performers is performed at a host device in accordance with some embodiments of the present invention(s).
Figure 7A:
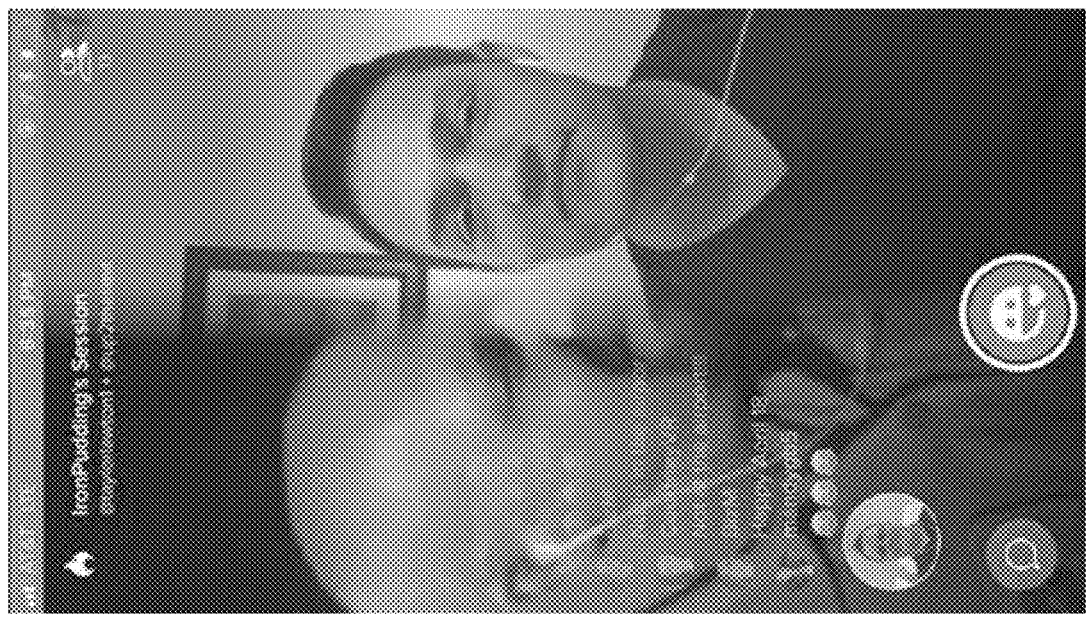

FIGS. 7A and 7B illustrate a video presentation of livestream content for which a compositing of images for first and second performers is performed at a host device in accordance with some embodiments of the present invention(s). In the illustrations, it will be appreciated that performance synchronized video of performers captured at respective host and guest devices are composited to provide visuals of the apparently live performance. An image blurring at boundary technique is illustrated.

Figure 8B:
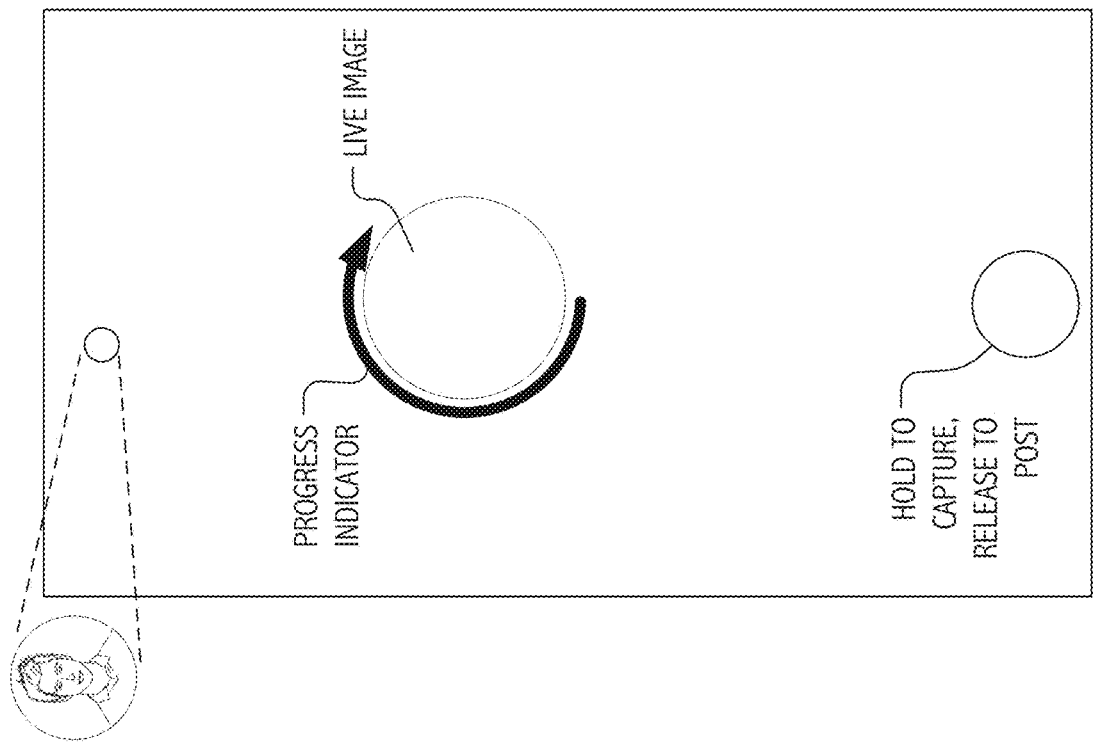
FIGS. 8A and 8B illustrate a selfie chat interaction mechanism in which a capture viewport is presented on screen and a user interaction mechanic is supported whereby a user holds a touchscreen-presented button or other feature to capture a video snippet and releases to post the video snippet in a social media interaction in accordance with some embodiments of the present invention(s).
Figure 8A:
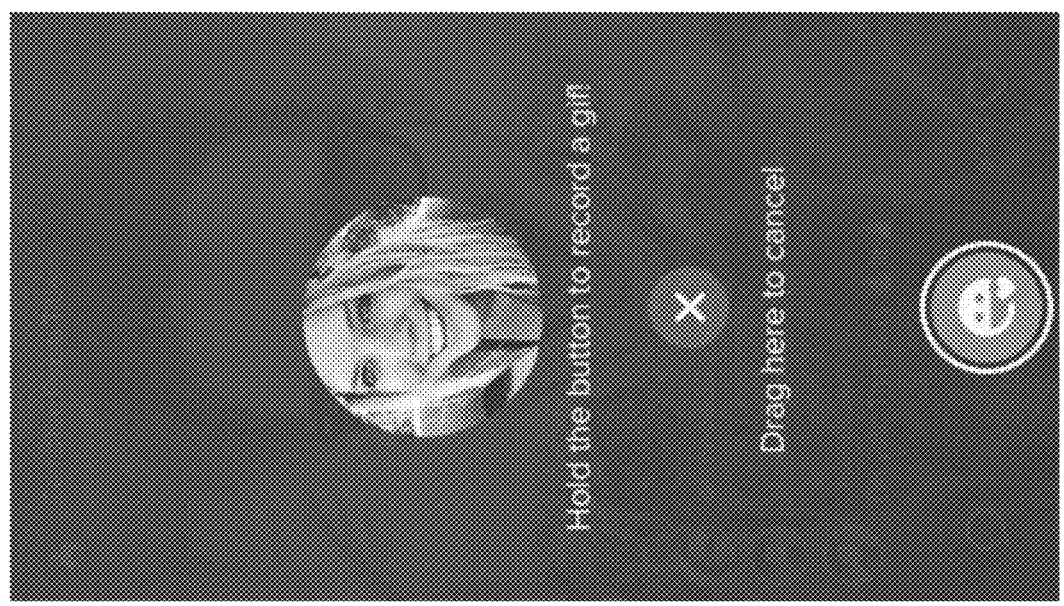

FIGS. 8A and 8B illustrate a selfie chat interaction mechanism in which a capture viewport is presented on screen and a user interaction mechanic is supported whereby a user holds a touchscreen-presented button or other feature to capture a video snippet and releases to post the video snippet in a social media interaction in accordance with some embodiments of the present invention(s). Some embodi-ments support alternative or additional gesture mechanics such as tap-to-start and tap-to-stop with a post confirmation.

FIGS. 9A, 9B and 9C illustrate a user part selection and coordination mechanism in which gestured selections by user-performers on geographically-distributed devices provide part selections on peer devices for a livestream performance in accordance with some embodiments of the present invention(s). Some embodiments support alternative or additional gesture mechanics including song selection such as based on coded interests of one or more of the user-performers, history of performances. In some cases or embodiments, song selection presents as a pseudorandom song roulette selection triggered by one or more of the user-performers or automatically such as based on expiry of a timer.

An Exemplary Mobile Device

FIG. 10 illustrates respective instances (701, 720A, 720B and 711) of computing devices programmed (or programmable) with vocal audio and video capture code, user interface code, pitch correction code, an audio rendering pipeline and playback code in accord with the functional descriptions herein. Device instance 701 is depicted operating in a vocal audio and performance-synchronized video capture mode, while devices instances 720A and 720B are depicted as operating in a mode that receives livestreamed mixed audiovisual performances. Though television-type display and/or set-top box equipment 720B is depicted operating in a livestream receiving mode, such equipment and computer 711 may operate as part of a vocal audio and performance synchronized video capture facility (as guest device 101A or host device 101B, recall FIG. 1). Each of the aforementioned devices communicate via wireless data transport and/or intervening networks 704 with a server 712 or service platform that hosts storage and/or functionality explained herein with regard to content server 110. Captured, pitch-corrected vocal performances mixed with performance-synchronized video to define a multi-vocalist audiovisual performance as described herein may (optionally) be livestreamed and audiovisually rendered at laptop computer 711.

OTHER EMBODIMENTS

While the invention(s) is (are) described with reference to various embodiments, it will be understood that these embodiments are illustrative and that the scope of the invention(s) is not limited to them. Many variations, modifications, additions, and improvements are possible. For example, while pitch correction vocal performances captured in accord with a karaoke-style interface have been described, other variations will be appreciated. Furthermore, while certain illustrative signal processing techniques have been described in the context of certain illustrative applications, persons of ordinary skill in the art will recognize that it is straightforward to modify the described techniques to accommodate other suitable signal processing techniques and effects.

In some embodiments in accordance with the present invention(s), an audio collaboration method is provided for broadcast of a joint performance of geographically distributed performers with non-negligible peer-to-peer communications latency between host and guest devices. The method includes (1) receiving at the host device, operating as a local peer, a media encoding of a mixed audio performance (i) including vocal audio captured at the guest device, communicatively coupled as a remote peer, from a first one of the performers and (ii) mixed with a backing audio track; (2) at the host device, audibly rendering the received mixed audio performance and capturing thereagainst vocal audio from a second one of the performers; and (3) mixing the captured second performer vocal audio with the received mixed audio performance for transmission to an audience as the broadcast, wherein the broadcast mix includes vocal audio of the first and second performers and the backing audio track with negligible temporal lag therebetween.

In some embodiments, the method further includes transmitting to plural recipients, over a wide-area network, the broadcast mix as a live stream, the plural recipients constituting the audience. In some embodiments, the method further includes the second performer, at the host device, selectively joining the first performer to the joint performance.

In some cases or embodiments, the joined first performer is selected from the audience and, at least for duration of the joint performance, is decoupled from live stream transmission of the broadcast to the audience. In some cases or embodiments, the transmitted live stream broadcast to the audience is temporally lagged by at least several seconds relative to the first performer vocal audio capture.

In some embodiments, the method further includes returning the first performer to the audience and, coincident therewith, recoupling to the live stream transmission. In some embodiments, the method further includes selectively joining a third performer as a new remote peer and thereafter (1) receiving at the host device a second media encoding (i) including vocal audio captured from the third performer at a new guest device, communicatively coupled as the new remote peer, and (ii) mixed with a second backing audio track; (2) at the host device, audibly rendering the second media encoding and capturing thereagainst additional vocal audio from the second performer; and (3) mixing the captured additional vocal audio with the received second media encoding for transmission to the audience as a continuation of the broadcast, wherein the broadcast mix includes vocal audio of the second and third performers and the second backing audio track with negligible temporal lag therebetween.

In some embodiments, the method further includes supplying the second performer captured vocal audio to the guest device remote peer for audible rendering at the guest device with at least some guest-side temporal lag relative to the capture of vocal audio from the first performer. In some cases or embodiments, the apparent guest-side temporal lag is at least about 40-1200 ms.

In some cases or embodiments, a substantial entirety of the non-negligible peer-to-peer communications latency is apparent in the guest-side temporal lag. In some cases or embodiments, essentially none of the non-negligible peer-to-peer communications latency is apparent at the host device or in the broadcast mix of first and second performers. In some cases or embodiments, the non-negligible peer-to-peer communications latency includes input signal to send delay, network delay, jitter buffer delay and buffer and output delay. The non-negligible peer-to-peer communications latency may vary and, in some cases, can be psychoacoustically significant. In some cases or embodiments, the non-negligible peer-to-peer communications latency is at least about 30-100 ms. In some cases or embodiments, the non-negligible peer-to-peer communications latency is at least about 100-250 ms. In some cases or embodiments, the non-negligible peer-to-peer communications latency is about 100-600 ms.

In some cases or embodiments, receipt at the host device of the mixed audio performance and supply of the second performer captured vocal audio to the guest device are via a peer-to-peer audiovisual connection using a Web Real-Time Communications (WebRTC)-type framework. In some embodiments, the method further includes supplying the broadcast mix of vocal audio of the first and second performers over a wide-area network. In some cases or embodiments, supply of the broadcast mix is via a real-time messaging protocol (RTMP)-type audiovisual streaming protocol. In some cases or embodiments, at least the guest device constitutes a mobile handheld phone or media player.

In some embodiments, the method further includes pitch correcting second performer vocals at the host device in accord with a vocal score that encodes a sequence of notes for a vocal melody. In some embodiments, the method further includes pitch correcting at the host device second performer vocals in accord with a vocal score that encodes at least a first set of harmony notes for at least some portions of the vocal melody.

In some cases or embodiments, the first performer vocals included in the received mixed performance are pitch corrected vocals. In some cases or embodiments, one of the first and second performer vocals is pitch corrected in accord with a vocal score that encodes a sequence of notes for a vocal melody, and the other of the first and second performer vocals in accord with a vocal score that encodes at least a first set of harmony notes for at least some portions of the vocal melody.

In some cases or embodiments, either or both of the first and second performer vocals are computationally processed, prior to inclusion in the broadcast, to apply one or more audio effects. In some cases or embodiments, the applied audio effects include one or more of a reverberation effect, digital filtering, spectral equalization, non-linear distortion, audio compression, pitch correction or pitch shifting, channel-relative gain and/or phase delay to manipulate apparent placement of the first or second performer within a stereo field.

In some cases or embodiments, the received media encoding includes video that is performance synchronized with the captured first performer vocals, the method further includes capturing, at the host device, video that is performance synchronized with the captured second performer vocals, and the broadcast mix is an audiovisual mix of captured audio and video of at least the first and second performers.

In some embodiments, the method further includes dynamically varying in the broadcast mix at least visual prominence of one or the other of the first and second performers based on evaluation of a computationally audio defined feature of either or both of the first and second performer vocals. In some embodiments, the method further includes applying one or more video effects to the broadcast mix based, at least in part, on a computationally defined audio or video feature of either or both of the first and second performer audio or video.

In some embodiments, the method further includes receiving at the host device, chat messages from members of the audience. In some embodiments, the method further includes incorporating at least some content of the chat messages as part of video of the broadcast mix. In some embodiments, the method further includes receiving at the host device, one or more of chat messages, emojis, animated GIFs and voting indications from members of the audience. In some embodiments, the method further includes incorporating a visual presentation of at least some of the received chat messages content, emojis, animated GIFs or voting indications as part of the broadcast mix.

In some embodiments, the method further includes queuing playlist requests from one or more recipients of the broadcast mix. In some embodiments, responsive to a selection by the second performer at the host device of a particular one of the queued playlist requests, the method further includes retrieving one or more of the backing audio track, lyrics, and score-coded note targets from a content repository. In some embodiments, responsive to a selection by the second performer at the host device of a particular one of the queued playlist requests, the method further includes demand supplying the communicatively-coupled guest device with one or more of the backing audio track, lyrics and score-coded note targets.

In some cases or embodiments, the broadcast mix is presented as a vocal duet. In some embodiments, the method further includes receiving at the host device a media encoding of at least another mixed audio performance (i) that constitutes vocal audio captured at another guest device, communicatively coupled as another remote peer, from a third performer and (ii) is temporally aligned or alignable with the backing audio track. In some cases or embodiments, audio of the live stream includes both conversational-type audio portions captured in correspondence with interactive conversation between the first and second performers and vocal performance audio portions captured in correspondence with vocal musical performance of either or both of the first and second performers against the backing audio track.

In some embodiments, the method further includes selecting a highlights clips set of segments from the live stream, wherein highlights clips set of segments generally include the vocal musical performance portions and generally exclude the conversational-type audio portions. In some embodiments, the method further includes selecting a highlight clips set of segments from the live stream based on one or more of audience reactions to the live stream, song structure, and audio power. In some embodiments, the method further includes selecting a highlight clips set of segments based on correspondence of particular audio portions of the live stream with verse, chorus or musical section boundaries, whether score-coded or computationally determined by audio feature analysis. In some embodiments responsive to selection by a user, the method further includes saving or sharing an audiovisual encoding of one or more of the highlight clips.

In some embodiments, the method further includes receiving from the guest device one or more lyrics synchronization markers. The lyrics synchronization markers convey to the host device a temporal alignment of lyrics visually presented at the guest device with the vocal audio captured the guest device. In some embodiments, the method further includes visually presenting the lyrics at the host device, wherein the visual presentation of the lyrics is temporally aligned with the media encoding of the mixed audio performance received from the guest device based on the received one or more lyrics synchronization markers. In some cases or embodiments, the received one or more lyrics synchronization markers coordinate progression of the lyrics presented on the host device with a pause or other temporal control at the guest device.

In some embodiments in accordance with the present invention(s), a system for dissemination of an apparently live broadcast of a joint performance of geographically-distributed first and second performers includes host and guest devices. The host and guest devices are coupled as local and remote peers by communication network with non-negligible peer-to-peer latency for transmissions of audiovisual content. The host device is communicatively coupled as the local peer to receive a media encoding of a mixed audio performance constituting vocal audio captured at the guest device, and the guest device is communicatively coupled as the remote peer to supply the media encoding captured from a first one of the performers and mixed with a backing audio track. The host device is configured to audibly render the received mixed audio performance, to capture thereagainst a vocal audio from a second one of the performers, and to mix the captured second performer vocal audio with the received mixed audio performance for transmission as the apparently live broadcast.

In some embodiments in accordance with the present invention(s), an audio collaboration method for a livestream broadcast of a coordinated audiovisual work of first and second performers captured at respective geographically-distributed, first and second devices includes: (a) receiving at the second device, a media encoding of a mixed audio performance (i) including vocal audio captured at the first device from a first one of the performers and (ii) mixed with a backing audio track; (b) at the second device, audibly rendering the received mixed audio performance and capturing thereagainst vocal audio from a second one of the performers; (c) mixing the captured second performer vocal audio with the received mixed audio performance to provide a broadcast mix that includes the captured vocal audio of the first and second performers and the backing audio track without apparent temporal lag therebetween; and (d) supplying the broadcast mix to a service platform configured to livestream the broadcast mix to plural recipient devices constituting an audience.

In some cases or embodiments, the first device is associated with the second device as a current livestream guest, and the second device operates as a current livestream host. The current livestream host controls association and dissociation of particular devices from the audience as the current livestream guest. In some cases or embodiments, the current livestream host selects from a queue of requests from the audience to associate as the current livestream guest.

In some cases or embodiments, the first device operates in a livestream guest role and the second device operates in a livestream host role. The method further includes either or both of: the second device releasing the livestream host role for assumption by another device; and the second device passing the livestream host role to a particular device selected from a set comprising the first device and the audience.

Embodiments in accordance with the present invention may take the form of, and/or be provided as, a computer program product encoded in a machine-readable medium as instruction sequences and other functional constructs of software, which may in turn be executed in a computational system (such as a iPhone handheld, mobile or portable computing device, media application platform, set-top box, or content server platform) to perform methods described herein. In general, a machine readable medium can include tangible articles that encode information in a form (e.g., as applications, source or object code, functionally descriptive information, etc.) readable by a machine (e.g., a computer, computational facilities of a mobile or portable computing device, media device or streamer, etc.) as well as non-transitory storage incident to transmission of the information. A machine-readable medium may include, but need not be limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance, Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A collaboration method for a livestream broadcast of a coordinated audiovisual work of first and second performers captured at respective geographically-distributed, first and second devices, the method comprising:

receiving, at the second device, a media encoding of an audiovisual performance mixed with a backing audio track and including (i) vocal audio captured at the first device from a first one of the performers and (ii) video that is performance synchronized with the captured first performer vocals;

at the second device, audibly rendering the received mixed audio performance and capturing thereagainst vocal audio from a second one of the performers;

mixing, at the second device, the second performer vocal audio captured by the second device with the mixed audiovisual performance received from the first device to provide a broadcast audiovisual mix that includes the captured vocal audio of the first and second performers and the backing audio track without apparent temporal lag therebetween; and supplying the audiovisual broadcast mix to a service platform configured to livestream the broadcast audiovisual mix to plural recipient devices constituting an audience.

2. The method of claim 1, wherein the performance synchronized video included in the received media encoding is captured in connection with the vocal capture at the first device, wherein the method further includes capturing, at the second device, video that is performance synchronized with the captured second performer vocals, and wherein the audiovisual broadcast mix is an audiovisual mix of captured audio and video of at least the first and second performers.

3. The method of claim 1, further comprising:

capturing, at the second device, second performer video that is performance synchronized with the captured second performer vocals; and compositing the second performer video with video for the first performer in the supplied audiovisual broadcast mix.

4. The method of claim 3, wherein the first and second performer video compositing includes, for at least some portions of the supplied audiovisual broadcast mix, a computational blurring of image frames of first and second performer video at a visual boundary therebetween.

5. The method of claim 3, further comprising:

dynamically varying in a course of the audiovisual broadcast mix relative visual prominence of one or the other of the first and second performers.

6. The method of claim 5, wherein the dynamic varying is, at least partially, in correspondence with time varying vocal part codings in an audio score corresponding to and temporally synchronized with the backing audio track.

7. The method of claim 5, wherein the dynamic varying is, at least partially, based on evaluation of a computationally defined audio feature of either or both of the first and second performer vocals.

8. The method of claim 1, wherein the first device is associated with the second device as a current livestream guest, and wherein the second device operates as a current livestream host, the current livestream host controlling association and dissociation of particular devices from the audience as the current livestream guest.

9. The method of claim 2, wherein the current livestream host selects from a queue of requests from the audience to associate as the current livestream guest.

10. The method of claim 1, wherein the first device operates in a livestream guest role and the second device operates in a livestream host role, the method further comprising either or both of:

the second device releasing the livestream host role for assumption by another device; and the second device passing the livestream host role to a particular device selected from a set comprising the first device and the audience.

11. The method of claim 1, further comprising:

accessing a machine readable encoding of musical structure that includes at least musical section boundaries coded for temporal alignment with the vocal audio captured at the first and second devices; and applying a first visual effect schedule to at least a portion of audiovisual broadcast mix, wherein the applied visual effect schedule encodes differing visual effects for differing musical structure elements of the first audiovisual performance encoding and provides visual effect transitions in temporal alignment with at least some of the coded musical section boundaries.

12. The method of claim 11, wherein the differing visual effects encoded by the applied visual effect schedule include for a given element thereof, one or more of:

a particle-based effect or lens flare;

transitions between distinct source videos;

animations or motion of a frame within a source video vector graphics or images of patterns or textures; and color, saturation or contrast.

13. The method of claim 11, wherein the associated musical structure encodes musical sections of differing types; and wherein the applied visual effect schedule defines differing visual effects for different ones of the encoded musical sections.

14. The method of claim 11,
wherein the associated musical structure encodes events or transitions; and
wherein the applied visual effect schedule defines differing visual effects for different ones of the encoded events or transitions.

15. The method of claim 11,
wherein the associated musical structure encodes group parts, and
wherein the applied visual effect schedule is temporally selective for particular performance synchronized video in correspondence with the encoded musical structure.

16. The method of claim 1, performed, at least in part, on a handheld mobile device communicatively coupled to a content server or service platform.

17. The method of claim 1, embodied, at least in part, as a computer program product encoding of instructions executable on the second device as part of a cooperative system including a content server or service platform to which a plurality of geographically-distributed, network-connected, vocal capture devices, including the second device, are communicatively coupled.

18. A system for dissemination of an apparently live broadcast of a joint performance of geographically-distributed first and second performers, the system comprising:
first and second devices coupled by a communication network with non-negligible peer-to-peer latency for transmission of audiovisual content;
the first device communicatively coupled to supply to the second device an audiovisual performance mixed with a backing audio track and including (1) vocal audio of the first performer captured against the backing audio track and (2) video that is performance synchronized therewith; and
the second device communicatively configured to receive a media encoding of the mixed audiovisual performance and to audibly render at least audio portions of the mixed audiovisual performance, to capture thereagainst vocal audio of the second performer, and to mix, at the second device, the second performer vocal audio captured by the second device with the mixed audiovisual performance received from the first device for transmission as the apparently live broadcast.

19. The system of claim 18,
wherein the second device is further configured to capture second performer video that is performance synchronized with the captured second performer vocals and to composite the second performer video with video for the first performer in the supplied audiovisual broadcast mix.

20. The system of claim 19,
wherein the first and second performer video compositing includes, for at least some portions of the supplied audiovisual broadcast mix, a computational blurring of image frames of first and second performer video at a visual boundary therebetween.

21. The system of claim 19,
wherein the first and second performer video compositing includes dynamically varying in a course of the audiovisual broadcast mix relative visual prominence of one or the other of the first and second performers.

22. The system of claim 21,
wherein the dynamic varying is, at least partially, in correspondence with time varying vocal part codings in an audio score corresponding to and temporally synchronized with the backing audio track.

23. The system of claim 21,
wherein the dynamic varying is, at least partially, based on evaluation of a computationally defined audio feature of either or both of the first and second performer vocals.

24. The system of claim 18,
wherein the first device is associated with the second device as a current livestream guest, and
wherein the second device operates as a current livestream host, the current livestream host controlling association and dissociation of particular devices from the audience as the current livestream guest.

25. The system of claim 24,
wherein the current livestream host selects from a queue of requests from the audience to associate as the current livestream guest.

26. The system of claim 18, further comprising:
a video compositor that accesses a machine readable encoding of musical structure including at least musical section boundaries coded for temporal alignment with the vocal audio captured at the first and second devices and that applies a first visual effect schedule to at least a portion of audiovisual broadcast mix, wherein the applied visual effect schedule encodes differing visual effects for differing musical structure elements of the first audiovisual performance encoding and provides visual effect transitions in temporal alignment with at least some of the coded musical section boundaries.

27. The system of claim 26, wherein the video compositor is hosted either on the second device or on a content server or service platform through which the apparently live performance is supplied.

28. The system of claim 18,
wherein, as part of a user interface visual on either or both of the first and second devices, for a current song selection, a different vocal part selection is presented for each of the performers; and
wherein responsive to, and in correspondence with, gestures by either or both of the first and second performers at the respective geographically-distributed devices, the vocal part selections are updated, wherein assignment of a particular vocal part selection to the respective first or second performers is changeable until one or the other of the first and second performers gestures a start of vocal capture on a respective geographically-distributed device, whereupon a then-current assignment of particular vocal part selections to the respective first or second performers is fixed for duration of capture of the coordinated multi-vocal performance.

\* \* \* \* \*